(12) United States Patent
Furuhashi

(10) Patent No.: US 8,037,239 B2
(45) Date of Patent: Oct. 11, 2011

(54) STORAGE CONTROLLER

(75) Inventor: Ryoji Furuhashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 828 days.

(21) Appl. No.: 11/387,968

(22) Filed: Mar. 24, 2006

(65) Prior Publication Data

US 2007/0192560 A1 Aug. 16, 2007

(30) Foreign Application Priority Data

Feb. 10, 2006 (JP) ................................. 2006-034489

(51) Int. Cl.
G06F 12/00 (2006.01)

(52) U.S. Cl. ...................... 711/112; 711/E12.013; 711/4

(58) Field of Classification Search ................... 711/170, 711/4, 112, 100, 154, 114
See application file for complete search history.

(56) References Cited

U.S. PATENT DOCUMENTS

| | | | |
|---|---|---|---|
| 4,430,701 A | | 2/1984 | Christian et al. |
| 5,796,580 A | * | 8/1998 | Komatsu et al. ............... 361/687 |
| 5,900,007 A | | 5/1999 | Nunnelley et al. |
| 5,901,327 A | | 5/1999 | Ofek |
| 6,631,442 B1 | * | 10/2003 | Blumenau ..................... 711/112 |
| 6,665,743 B2 | | 12/2003 | Benhase et al. |
| 6,681,291 B2 | | 1/2004 | Ikeuchi et al. |
| 6,725,328 B2 | | 4/2004 | Kano et al. |
| 6,772,283 B2 | | 8/2004 | Taroda et al. |
| 6,857,059 B2 | | 2/2005 | Karpoff et al. |
| 6,898,670 B2 | | 5/2005 | Nahum |
| 6,983,353 B2 | | 1/2006 | Tamer et al. |
| 7,093,068 B2 | | 8/2006 | Yamagami |
| 2002/0019908 A1 | | 2/2002 | Reuter et al. |
| 2002/0099914 A1 | | 7/2002 | Matsunami et al. |
| 2002/0112113 A1 | | 8/2002 | Karpoff et al. |
| 2002/0129216 A1 | | 9/2002 | Collins |
| 2002/0152143 A1 | * | 10/2002 | Sanada et al. ................... 705/32 |
| 2003/0009619 A1 | | 1/2003 | Kano et al. |
| 2003/0070043 A1 | | 4/2003 | Merkey |
| 2003/0225982 A1 | | 12/2003 | Fujita et al. |
| 2003/0229698 A1 | | 12/2003 | Furuhashi et al. |
| 2004/0044827 A1 | * | 3/2004 | Carlson et al. ..................... 711/4 |
| 2004/0054850 A1 | | 3/2004 | Fisk |
| 2004/0078542 A1 | * | 4/2004 | Fuller et al. ................... 711/172 |
| 2004/0148479 A1 | * | 7/2004 | Patel et al. ..................... 711/163 |
| 2004/0193760 A1 | * | 9/2004 | Matsunami et al. ............ 710/36 |

(Continued)

FOREIGN PATENT DOCUMENTS

GB 2406406 A * 3/2005

(Continued)

OTHER PUBLICATIONS

U.S. Appl. No. 11/253,148, filed Dec. 17, 2005, Nagai et al.

(Continued)

*Primary Examiner* — Reginald Bragdon
*Assistant Examiner* — Victor Wang
(74) *Attorney, Agent, or Firm* — Mattingly & Malur, PC

(57) ABSTRACT

Provided is a storage controller that will not impair the operation of a storage control system even when a new storage area is added to a pool corresponding to an AOU volume. This storage controller includes a logical volume accessible by a host system; a pool associated with the logical volume and including one or more physical storage areas configuring a storage area of the logical volume; and a memory for storing attribute information showing an attribute of a physical storage area included in the pool; wherein the controller is configured to add a new physical storage area to the pool based on the attribute information.

40 Claims, 22 Drawing Sheets

U.S. PATENT DOCUMENTS

| | | |
|---|---|---|
| 2004/0215749 A1 | 10/2004 | Tsao |
| 2004/0215879 A1* | 10/2004 | Matsunami et al. .......... 711/114 |
| 2004/0260861 A1 | 12/2004 | Serizawa et al. |
| 2004/0268070 A1* | 12/2004 | Hasegawa ..................... 711/162 |
| 2005/0055603 A1 | 3/2005 | Soran et al. |
| 2006/0101204 A1 | 5/2006 | Bao |
| 2007/0055713 A1 | 3/2007 | Nagai et al. |
| 2008/0065853 A1 | 3/2008 | Yamagami |

FOREIGN PATENT DOCUMENTS

| | | |
|---|---|---|
| JP | 11-224164 | 8/1999 |
| JP | 2003-015915 | 7/2001 |
| JP | 2004-013547 | 6/2002 |
| JP | 2002-222061 A | 8/2002 |
| JP | 2005-11316 A | 1/2005 |

OTHER PUBLICATIONS

U.S. Appl. No. 60/209,109, filed Jun. 2, 2000, Reuter et al.

U.S. Appl. No. 60/209,326, filed Jun. 2, 2000, Reuter et al.

Hough, Geoffrey, "3PAR Thin Provisioning", 3PARdata, Inc., Jun. 2003, pp. 1-14.

* cited by examiner

FIG.5

LOGICAL VOLUME-POOL TABLE

| LOGICAL VOLUME ID | POOL ID |
|---|---|
| a0 | 10 |
| a1 | 10 |
| b0 | 11 |
| c0 | 12 |
| c1 | 12 |
| d0 | 50 |
| d1 | 50 |
| e0 | 51 |
| e1 | 51 |
| f0 | 60 |

FIG.6

POOL-PHYSICAL VOLUME TABLE

| POOL ID | PHYSICAL VOLUME ID |
|---|---|
| 10 | 100 |
| 10 | 101 |
| 10 | 102 |
| 11 | 110 |
| 11 | 111 |
| 11 | 112 |
| 12 | 120 |
| 12 | 121 |
| 12 | 122 |
| 50 | 500 |
| 50 | 501 |
| 50 | 502 |
| 51 | 510 |
| 51 | 511 |
| 51 | 512 |
| 60 | 600 |

FIG.7

POOL ATTRIBUTE TABLE

| POOL ID | RAID LEVEL | DRIVE TYPE | HDD MODEL | CONNECTION TYPE | CAPACITY |
|---|---|---|---|---|---|
| 10 | RAID5 | FC | 15000 | INTERNAL | 36GB |
| 11 | RAID1 | FC | 10000 | INTERNAL | 7GB |
| 12 | RAID0+1 | FC | 10000 | INTERNAL | 14GB |
| 50 | RAID5 | FC | 10000 | EXTERNAL HIGH-END | 7GB |
| 51 | RAID1 | FC | 10000 | EXTERNAL HIGH-END | 14GB |
| 60 | RAID1 | ATA | 7200 | EXTERNAL MID-RANGE | 80GB |

FIG.8

PHYSICAL VOLUME ATTRIBUTE TABLE

| PHYSICAL VOLUME ID | RAID LEVEL | DRIVE TYPE | HDD MODEL | CONNECTION TYPE | ALLOCATED FLAG | CAPACITY |
|---|---|---|---|---|---|---|
| 100 | RAID5 | FC | 15000 | INTERNAL | 1 | 36GB |
| 101 | RAID5 | FC | 15000 | INTERNAL | 1 | 36GB |
| 102 | RAID5 | FC | 15000 | INTERNAL | 0 | 36GB |
| 110 | RAID1 | FC | 10000 | INTERNAL | 1 | 7GB |
| 111 | RAID1 | FC | 10000 | INTERNAL | 1 | 7GB |
| 112 | RAID1 | FC | 10000 | INTERNAL | 0 | 7GB |
| 120 | RAID0+1 | FC | 15000 | INTERNAL | 1 | 14GB |
| 121 | RAID0+1 | FC | 15000 | INTERNAL | 1 | 14GB |
| 122 | RAID0+1 | FC | 15000 | INTERNAL | 1 | 14GB |
| 500 | RAID5 | FC | 10000 | EXTERNAL HIGH-END | 1 | 7GB |
| 501 | RAID5 | FC | 10000 | EXTERNAL HIGH-END | 1 | 7GB |
| 502 | RAID5 | FC | 10000 | EXTERNAL HIGH-END | 0 | 7GB |
| 510 | RAID1 | FC | 10000 | EXTERNAL HIGH-END | 1 | 14GB |
| 511 | RAID1 | FC | 10000 | EXTERNAL HIGH-END | 1 | 14GB |
| 512 | RAID1 | FC | 10000 | EXTERNAL HIGH-END | 0 | 14GB |
| 600 | RAID1 | ATA | 7200 | EXTERNAL MID-RANGE | 1 | 80GB |

FIG.9

PERFORMANCE LEVEL TABLE

| PERFORMANCE LEVEL | RAID LEVEL | HDD MODE | CONNECTION TYPE |
|---|---|---|---|
| 1 | RAID1 | 7200 | EXTERNAL MID-RANGE |
| 2 | RAID0+1 | 10000 | EXTERNAL HIGH-END |
| 3 | RAID5 | 15000 | INTERNAL |

FIG.10

RELIABILITY LEVEL TABLE

| RELIABILITY LEVEL | DRIVE TYPE | CONNECTION TYPE |
|---|---|---|
| 1 | ATA | EXTERNAL MID-RANGE |
| 2 | FC | EXTERNAL HIGH-END |
| 3 | - | INTERNAL |

FIG.17

POLICY TABLE

| POLICY | RAID LEVEL REQUIREMENTS | DRIVE TYPE REQUIREMENTS | HDD MODEL REQUIREMENTS | CONNECTION TYPE REQUIREMENTS |
|---|---|---|---|---|
| HIGH PERFORMANCE, HIGH RELIABILITY | RAID0+1 OR HIGHER | FC OR BETTER | 15000 OR FASTER | INTERNAL OR BETTER |
| EMPHASIS ON PERFORMANCE | RAID5 OR HIGHER | - | 15000 OR FASTER | INTERNAL OR BETTER |
| EMPHASIS ON RELIABILITY | - | FC OR BETTER | - | INTERNAL OR BETTER |
| BACKUP | - | FC OR BETTER | - | EXTERNAL HIGH-END OR BETTER |
| ARCHIVE | - | ATA OR BETTER | - | EXTERNAL MID-RANGE OR BETTER |

FIG.18

POOL-POLICY TABLE

| POOL ID | POLICY |
|---|---|
| 10 | HIGH PERFORMANCE, HIGH RELIABILITY |
| 11 | EMPHASIS ON PERFORMANCE |
| 12 | EMPHASIS ON RELIABILITY |
| 50 | BACKUP |
| 51 | BACKUP |
| 60 | ARCHIVE |

STORAGE CONTROLLER

CROSS-REFERENCES TO RELATED APPLICATIONS

This application relates to and claims priority from Japanese Patent Application No. 2006-034489, filed on Feb. 10, 2006, the entire disclosure of which is incorporated herein by reference.

BACKGROUND

The present invention generally relates to a storage controller, and in particular relates to a storage controller that gives consideration to the performance or reliability of a physical volume upon adding a physical volume, which is allocated to a logical volume, to a logical volume.

As background art relating to this kind of storage controller, for instance, the storage control system described in Japanese Patent Laid-Open Publication No. 2004-13547 is known. This storage control system aims to improve the access performance to data and secure the reliability thereof in technology of allocating data to a data storage area of a plurality of storages, and has a computer, a plurality of storage apparatuses for storing data to be used by a program of the computer, and an allocation device for allocating data to a prescribed storage area for storing such data, wherein the allocation device decides the position of the storage area to be allocated based on characteristic information of the storage apparatus and volume requirement information showing the type or usage of data.

Further, Japanese Patent Laid-Open Publication No. 2003-15915 describes an automatic expansion method of capacity in a storage apparatus. With this method, the storage area of a storage apparatus is not decided uniquely, but is rather decided dynamically. The storage controller monitors the logical block address of the read or write I/O to be access from a host to a logical volume of the storage apparatus. The storage controller dynamically extends the storage area of the logical volume based on the acquired logical block address. Moreover, the storage controller reduces/expands the storage area of the logical volume based on the capacity reduction/expansion command of the logical volume from a command unit of the host to a volume server.

SUMMARY

When the data to be exchanged between a storage controller and a host system connected to this storage controller increases, it is necessary to increase the capacity of the logical volume in the storage controller to be accessed by the host system. Here, a large-capacity logical volume is provided to the storage controller, and data of the existing logical volume is copied to this logical volume. Nevertheless, with this method, access from the host system to the logical volume must be restricted until copying is complete. Further, as described in Japanese Patent Laid-Open Publication No. 2003-15915, even when dynamically adding a storage area of a logical block to the logical volume, depending on the performance of the storage area; for instance, performance of the device providing the storage area to be added, the process of creating a logical volume may deteriorate and affect the operation of a storage control system using the storage controller. Thus, an object of the present invention is to provide a storage controller that will not impair the operation of a storage control system even when a new storage area is added to a pool corresponding to an AOU volume. Another object of the present invention is to provide a storage controller that adds a storage area of a prescribed performance or higher to a storage area group to which a logical volume is to be added.

In order to achieve the foregoing objects, the present invention groups the aggregate of storage areas to be added to the logical volume as the same pool, and allocates, from this pool, a storage area in the pool to the logical volume. Further, when there is shortage of storage areas in the pool, the present invention add a separate storage area to this pool. As a result of the foregoing configuration, it is possible to control in group units the attribute, characteristic or performance of the storage area to be added to the logical volume. The dynamic expansion of storage capacity of the logical volume is referred to as Allocation on Use (hereinafter referred to as "AOU"), and a logical volume employing AOU is referred to as an AOU volume. Specifically, the present invention provides a desired attribute value to the pool and the storage area to be added to the pool, and the storage area satisfying this attribute is added to the pool. In other words, the present invention provides a storage controller connected to a host system including a storage device for providing a storage area to the host system, and a controller for controlling the input and output of data between the storage area and the host system, having: a logical volume accessible by the host system; a pool associated with the logical volume and including one or more physical storage areas configuring a storage area of the logical volume; and a memory for storing attribute information showing an attribute of a physical storage area included in the pool; wherein the controller is configured to add a new physical storage area to the pool based on the attribute information. According to the present invention, it is possible to add a physical volume coinciding with the attribute required by the AOU volume to a pool.

As explained above, according to the present invention, it is possible to provide a storage controller that will not impair the operation of a storage control system even when a new storage area is added to a pool corresponding to a logical volume. Further, according to the present invention, it is also possible to provide a storage controller that will not add to a pool a storage area having a performance that is lower than the storage area that was originally in the pool. Therefore, it is possible to prevent the operation of the storage control system from deteriorating as a result of the performance of the logical volume becoming deteriorated, and to avoid a drawback of storing important data in a low-reliability storage area.

DESCRIPTION OF DRAWINGS

FIG. 5 is a control table showing the correspondence of a logical volume (AOU volume) and a pool;

FIG. 6 is a control table showing the correspondence of a pool and a physical volume;

FIG. 7 is a control table showing the attributes per pool;

FIG. 8 is a physical volume attribute table;

FIG. 9 is a table for leveling the performance, which is an attribute of the pool and physical volume;

FIG. 10 is a table for leveling the reliability, which is an attribute of the pool and physical volume;

FIG. 17 is a control table showing the relationship between a policy and an attribute, which is the content of a policy;

FIG. 18 is a control table showing the relationship between a pool ID and a policy;

DETAILED DESCRIPTION

Figure 1:
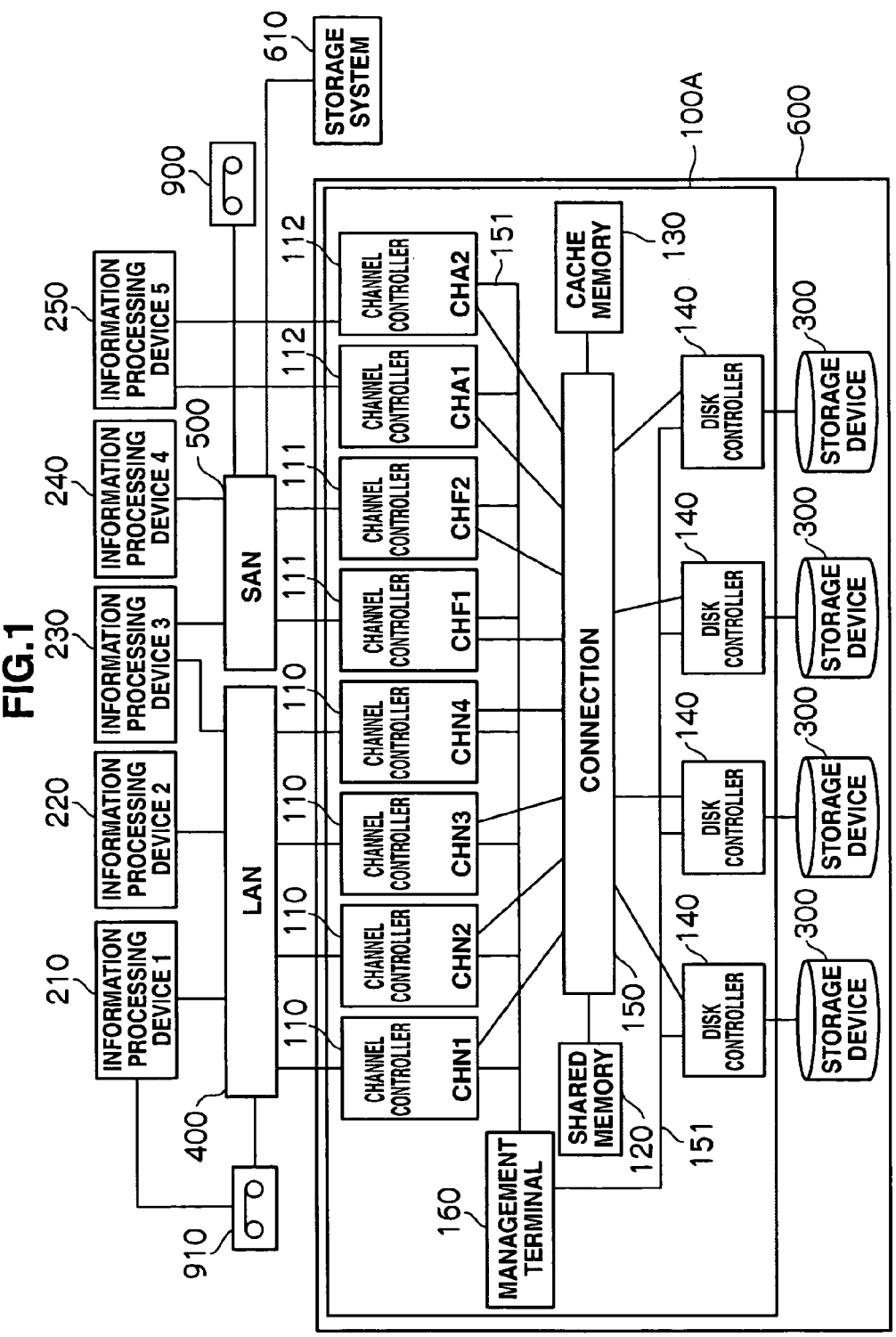
FIG. 1 is a hardware block diagram showing a storage control system including the storage controller pertaining to the present invention.

Next, embodiments of the present invention are explained. FIG. 1 is a hardware block diagram showing a storage control system having a storage controller pertaining to the present invention. The storage controller 600 is configured by including a plurality of storage devices 300, and a storage device control unit 100A for controlling the input and output to and from the storage devices 300 in reply to the I/O request from an information processing device (host). Information processing devices 1 to 3 (210, 220, 230) are connected to a storage controller 600 via a LAN 400. A data access request (a data I/O request in file units) is transmitted from the information processing devices 1 to 3 to channel controllers (channel adapters) CHN 1 to CHN 4 (110) based on file name designation.

A backup device 910 is connected to the LAN 400. The backup device 910 stores backup data of data stored in the storage device 300 by communicating with the storage device controller 100 via the LAN 400.

The storage device controller 100 has channel controllers CHN 1 to 4 (110). The storage device controller 100 mediates the write access or read access between the information processing devices 1 to 3 and backup device 910 and storage device 300 via the channel controllers CHN 1 to 4 (110) and LAN 400. The channel controllers CHN 1 to 4 (110) individually receive the file access requests from the information processing devices 1 to 3. In other words, the channel controllers CHN 1 to 4 (110) are individually allocated with a network address (for instance, an IP address) on the LAN 400, and separately behave as a file server (NAS) described later to provide services as a file server to the information processing devices 1 to 3 (200).

As a result of a single storage controller 600 being configured to include the channel controllers CHN 1 to 4 (110) that individually provide service as a NAS, the NAS servers which were individually operated by independent computers in the past are now consolidated into a single storage controller 600. Then, the coordinated management of the storage controller 600 is thereby enabled, and it is possible to streamline maintenance operations such as various configurations and controls, failure management, version management and so on.

The information processing devices 3 to 4 (200) are connected to the storage device controller 100 via a SAN 500. The SAN 500 is a network for transferring data to and from the information processing devices 3 and 4 (230, 240, 250) in block units, which is a data management unit in a storage area provided by the storage device 300.

Communication conducted between the information processing devices 3 and 4 (200) and storage device controller 100 via the SAN 500 is generally conducted according to a fibre channel protocol. A SAN-compliant backup device 900 is connected to the SAN 500.

In addition to the channel controllers CHN 1 to 4 (110), the storage device controller 100 also has channel controllers CHF 1 and 2 (111). The storage device controller 100 communicates with the information processing devices 3 and 4 and SAN-compliant backup device 900 via the channel controllers CHF 1 and 2 (111) and SAN 500.

The information processing device 5 (250) is further connected to the storage device controller 100 without going through a network such as the LAN 400 or SAN 500. Another storage controller 610 installed at a remote location (secondary site) from the installation site (primary site) of the storage controller 600 is connected to the SAN 500. The storage controller 610 is used as a device of the replication destination of data in the replication function or remote copy function.

Like this, by mixing and installing the channel controllers CHN 1 to 4 (110), channel controllers CHF 1 and 2 (111), and channel controllers CHA 1 and 2 (112) in the storage controller 600, it is possible to realize a storage control system capable of connecting to different networks. In other words, this storage controller 600 is a SAN-NAS integrated storage system of connecting to the LAN 400 using the channel controllers CHN 1 to 4 (110), and connecting to the SAN 500 using the channel controllers CHF 1 and 2 (111). The network of LAN and SAN is configured with FC-SW.

A connection 150 interconnects the respective channel controllers 110, a shared memory 120, a cache memory 130, and respective disk controllers 140. The transmission/reception of commands or data between the channel controller 110, shared memory 120, cache memory 130 and disk controller 140 is conducted via the connection 150. The connection 150, for instance, is configured from a high-speed bus such as an ultra high-speed crossbar switch that performs data transfer by way of high-speed switching. The connection 150 forms and switches a path between the volume of the storage device 300 and file servers (CHN 1 to CHN 4).

The shared memory 120 and cache memory 130 are memory devices to be shared by the channel controllers 110 and disk controllers 140. The shared memory 120 is primarily used for storing control information and commands, and the cache memory 130 is primarily used for storing data. The disk controller 140 is monitoring the shared memory 120, and when it determines that a write command has been written in the shared memory 120, it reads write data from the cache memory 130 and writes this in the storage device 300 according to the write command.

When the data I/O command received by a certain channel controller 110 from the information processing device 200 is a read command, the channel controller 110 writes such read command in the shared memory 120, and checks whether data to be read exists in the cache memory 130.

The disk controller 140 converts the data access request to the storage device 300 based on a logical address designation transmitted from the channel controller 110 into a data access request based on a physical address designation, and writes data in or reads data from the storage device 300 in reply to the I/O request output from the channel controller 110.

The storage device 300 has one or more disk drives, and provides a storage area accessible from the information processing device 200. A logical volume formed by combining the storage space of one or more physical volumes is configured in the storage area provided by the storage device 300. As the logical volume configured in the storage device 300, there is a user logical volume accessible from the information processing device 200, or a system logical volume used for controlling the channel controller 110.

The user logical volume is configured in RAID. The management terminal 160 is a computer device for maintaining and managing the storage controller 600, and is connected to the respective channel controllers 110 and disk controllers 140 via an internal LAN 151. As a result of operating the management terminal 160, the administrator is able to configure the disk drives of the storage device 300, configure the logical volume, install micro programs to be executed by the channel controller 110 and disk controller 140, among other tasks.

Figure 2:
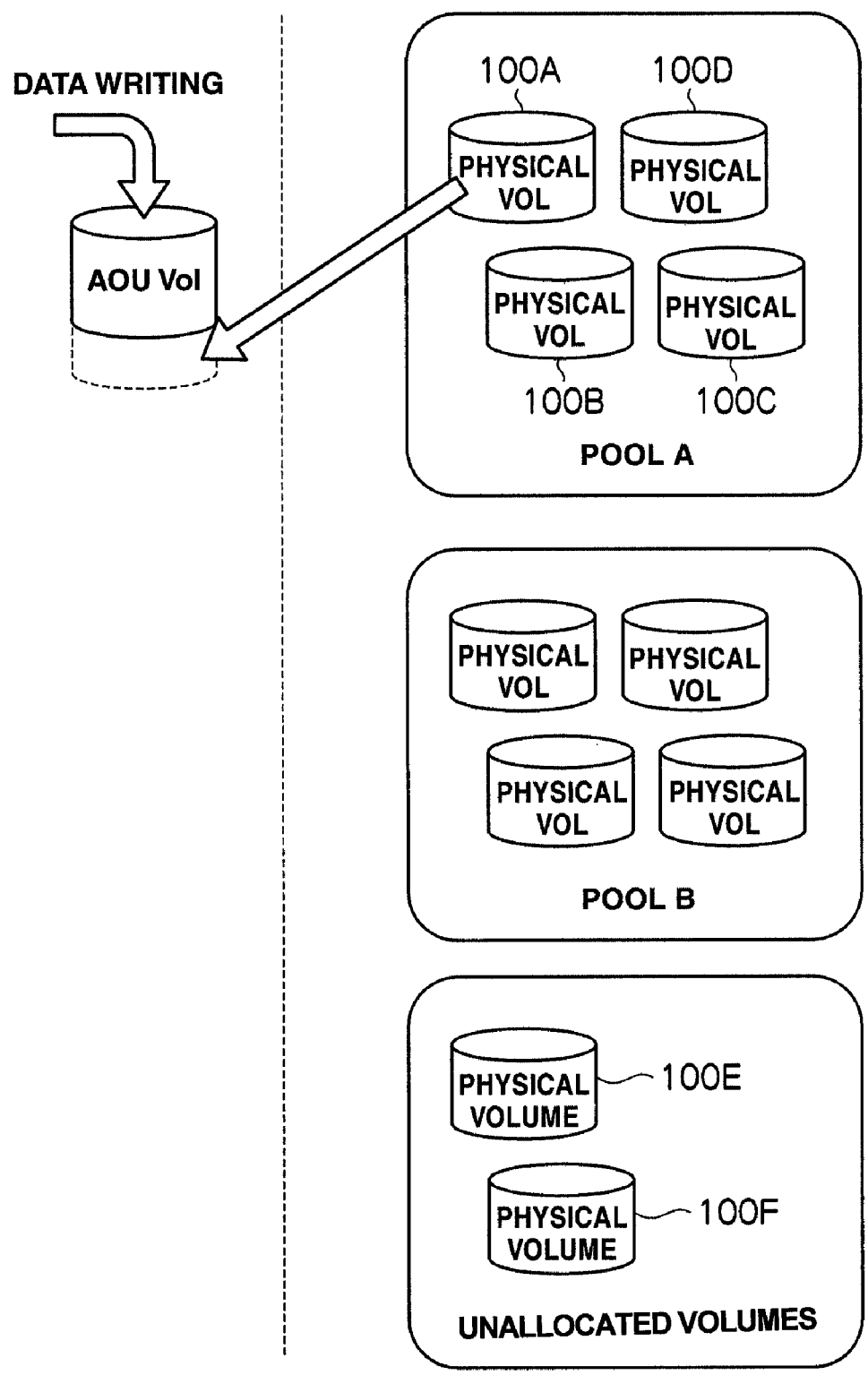
FIG. 2 is a functional block diagram for explaining an AOU volume.

A part of the user logical volume is configured as the foregoing AOU volume as shown in FIG. 2. The AOU volume (AOU vol) is accessible from the host. A pool A is allocated to each AOU vol. Physical volumes (physical storage areas) 100A to 100D are allocated to the pool A. The AOU volume itself is a virtual volume that does not have a storage area, and the physical volume of the pool is providing the actual storage area of the AOU volume.

Figure 23:
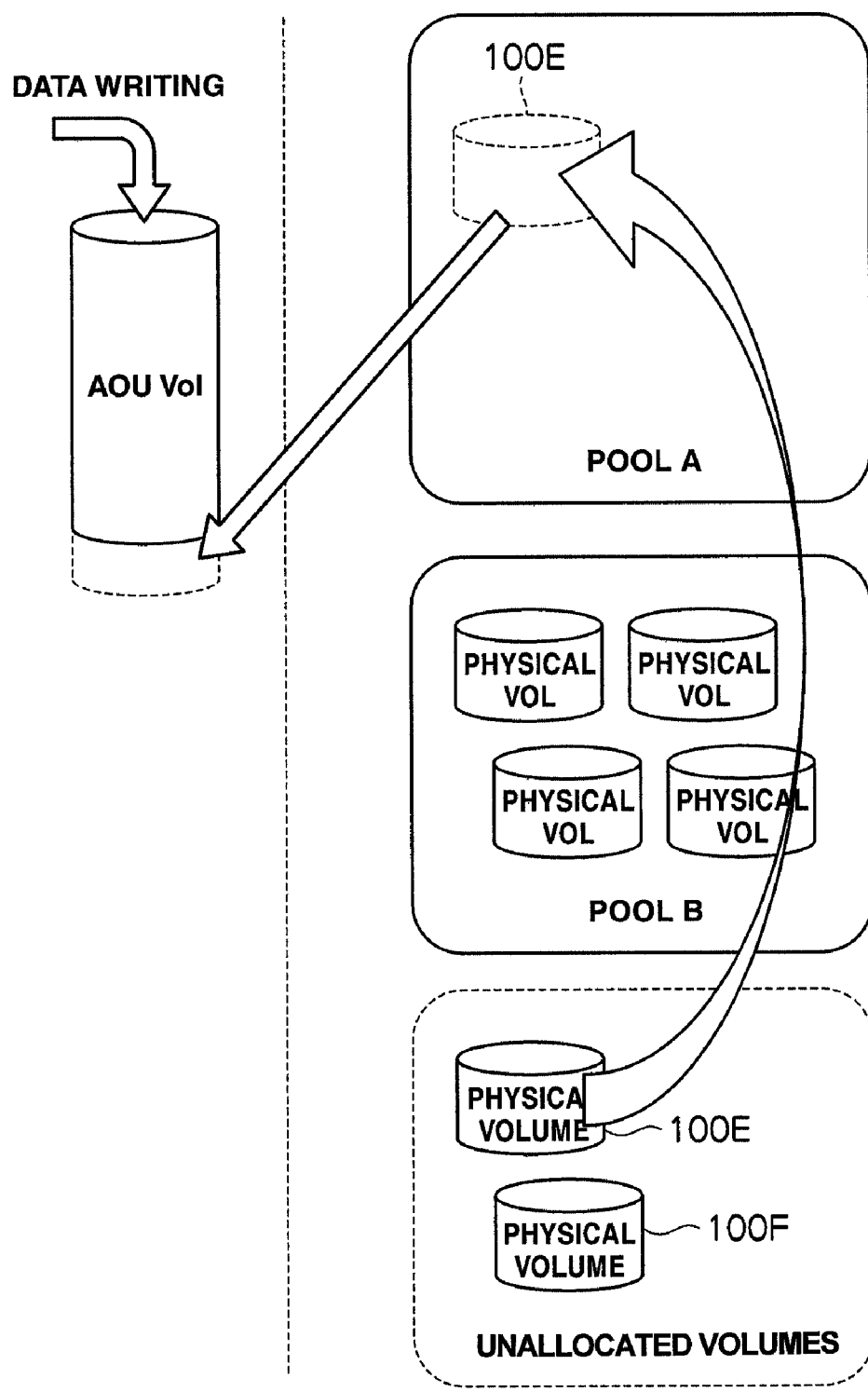
FIG. 23 is a functional block diagram of a storage control system showing the operation of allocating an unallocated physical volume to a pool.

When a data write command is sent from the host to the AOU vol, for example, data is written in a physical volume 100A. The storage controller has a plurality of pools (pool A, pool B). Each pool is allocated to an AOU vol. The same pool may be allocated to a plurality of AOU vols. Physical volumes 100E and 101E are not allocated to a pool. When there is shortage of physical volumes in a pool, a physical volume that has not yet been allocated to a pool is allocated to such pool. FIG. 23 is a logical block diagram showing this operation. FIG. 23 shows the situation where an unallocated physical volume 100E is added to the pool A, and this physical volume 100E is allocated to the AOU vol. FIG. 23 shows that the physical volume 100E is newly allocated to the AOU vol, and data from the host is newly written in the storage area of the physical volume 100E.

Figure 24:
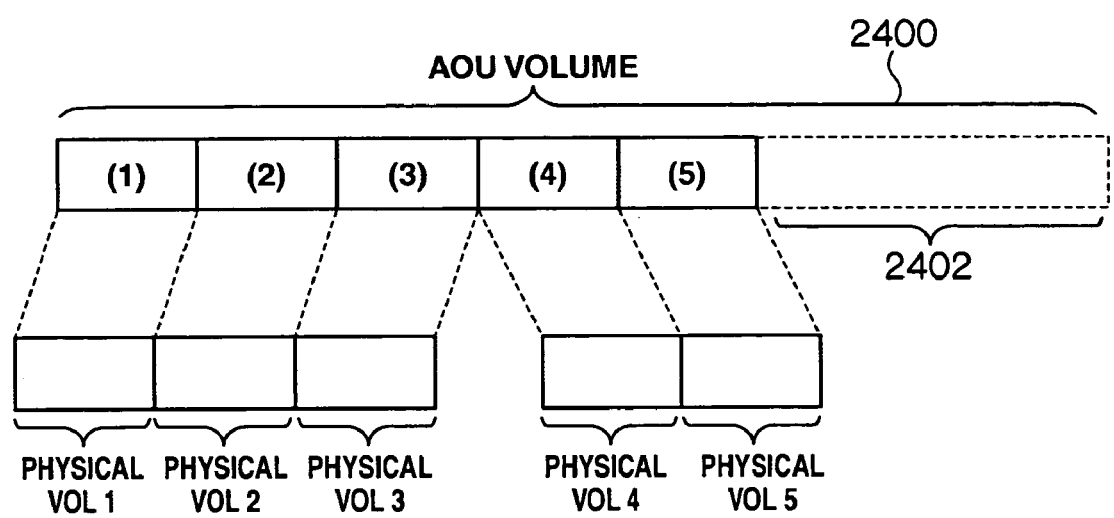
FIG. 24 is an address mapping table of an AOU volume.

FIG. 24 is an address mapping table of the AOU volume. AOU volumes (1) to (5) form a logical block address group, and, for instance, the diagram shows that a physical Vol is configuring the address area represented with (1). Although it is desirable that physical vol 1 to vol 5 belong to the same pool as described later in order to maintain the physical volume or the attribute of the storage device providing the physical volume at a prescribed level or higher, these physical Vols may also belong to different pools.

In FIG. 24, the AOU vol is making the host system recognize a superficial storage capacity 2400. In other words, the host system recognizes the capacity of AOU vol to be the storage capacity 2400. Incidentally, a sufficiently large value is selected for the superficial storage capacity of the AOU vol, or the superficial storage capacity may be set without limitation. When a logical block address area (2402) to which a physical storage area is not allocated is included in the data write command sent from the host system to the storage controller, the storage controller, according to the operation shown in FIG. 2, allocates to the AOU vol a physical volume belonging to a pool and which has not yet been allocated to the AOU vol. The portion shown with the dotted line in the AOU vol of FIG. 2 is the actual storage area of the AOL vol that was expanded as a result of the physical volume being allocated to the AOU vol.

Figure 3:
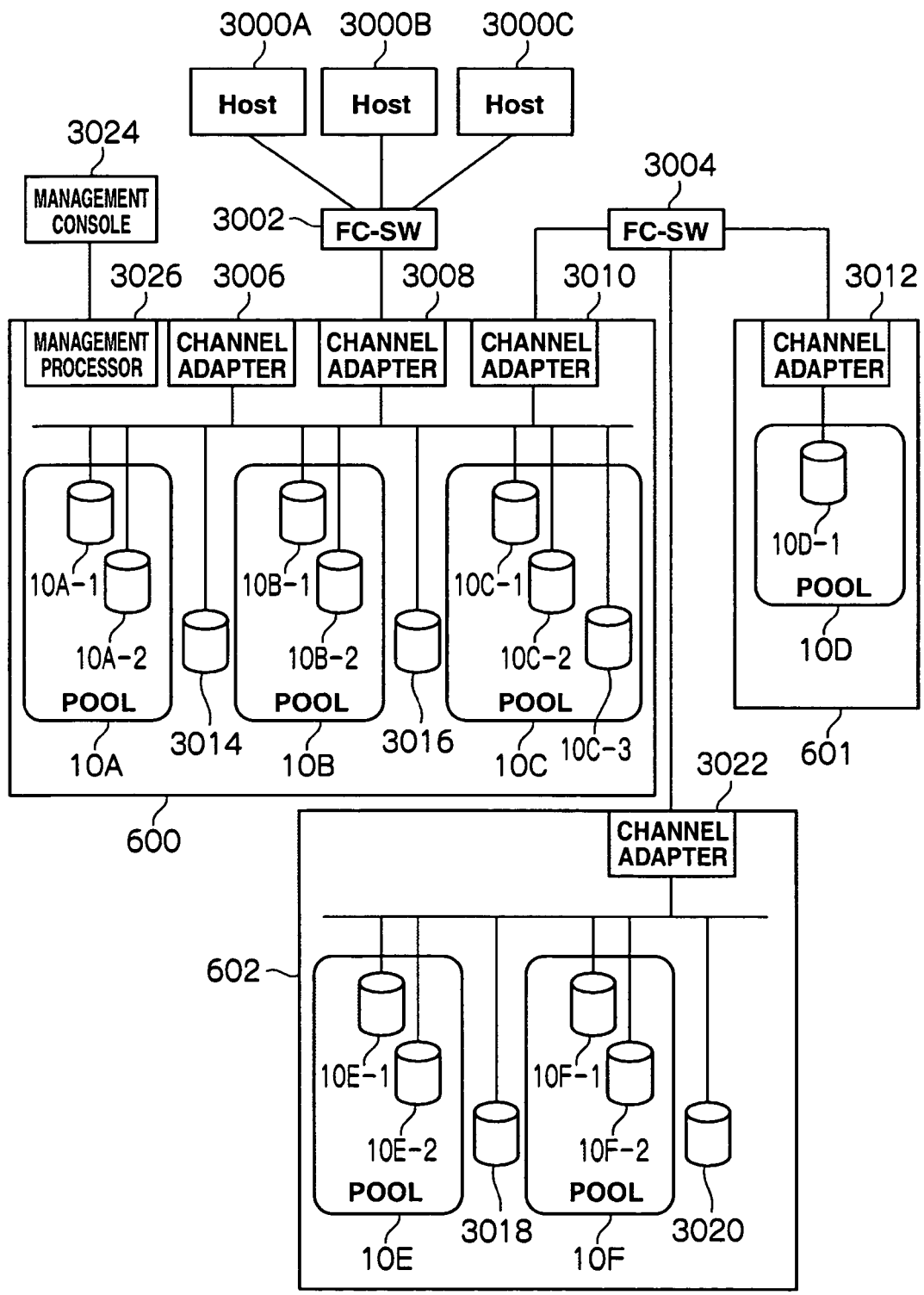
FIG. 3 is a functional block diagram clarifying the pool areas.

FIG. 3 is a functional block diagram of the storage control system clarifying the pool areas. Hosts 3000A to 3000C are connected to an FC-SW 3002. The storage controller 600 has channel adapters 3006, 3008, 3010, and these channel adapters access the logical volume via an internal bus. The storage controller 600 has pools 10A, 10B, 10C, and a plurality of physical volumes are mapped to each pool. Taking the pool 10A as an example, 10A-1 and 10A-2 are physical volumes. A channel adapter accessed from the host writes write data in a physical volume in a pool corresponding to the AOU volume via the AOU volume shown in FIG. 2.

The storage controller 600 is internally provided with a physical volume that is not associated with a pool or a logical volume that is not an AOU. Such physical volumes or logical volumes are represented with reference numerals 3014 and 3016. A management processor 3026 executes various control configurations in the storage controller 600. A management console 3024 is connected to this management processor [3026]. External storage controllers 601 and 602 are connected to the storage controller. Pools also exist in these external storage controllers.

The external storage controller 601 is connected to the storage controller 600 via the FC-SW 3004. FIG. 3 also illustrates a channel adapter 3012, a pool 10*d* and a physical volume 10*d*-1 in the pool. The host to be connected to the storage controller 600 is able to access the pool of the external storage controller 601 via the AOU volume configured in the storage controller. An external storage controller 602 accesses the storage controller 600 via the FC-SW 3004. FIG. 3 also illustrates a channel adapter 3022, pools 10*e* and 10*f*, and physical volumes 3018 and 3020. The host is able to access the pool 10*e* or 10*f* via the AOU volume defined in the storage controller 600. Further, the host is able to access the volumes 3018, 3020 of the external storage controller 602 via the virtual volumes defined in the storage controller 600. Therefore, the storage controller 600 is able to associate the volume of the external storage controller with the physical volume of one's own internal pool.

Figure 4:
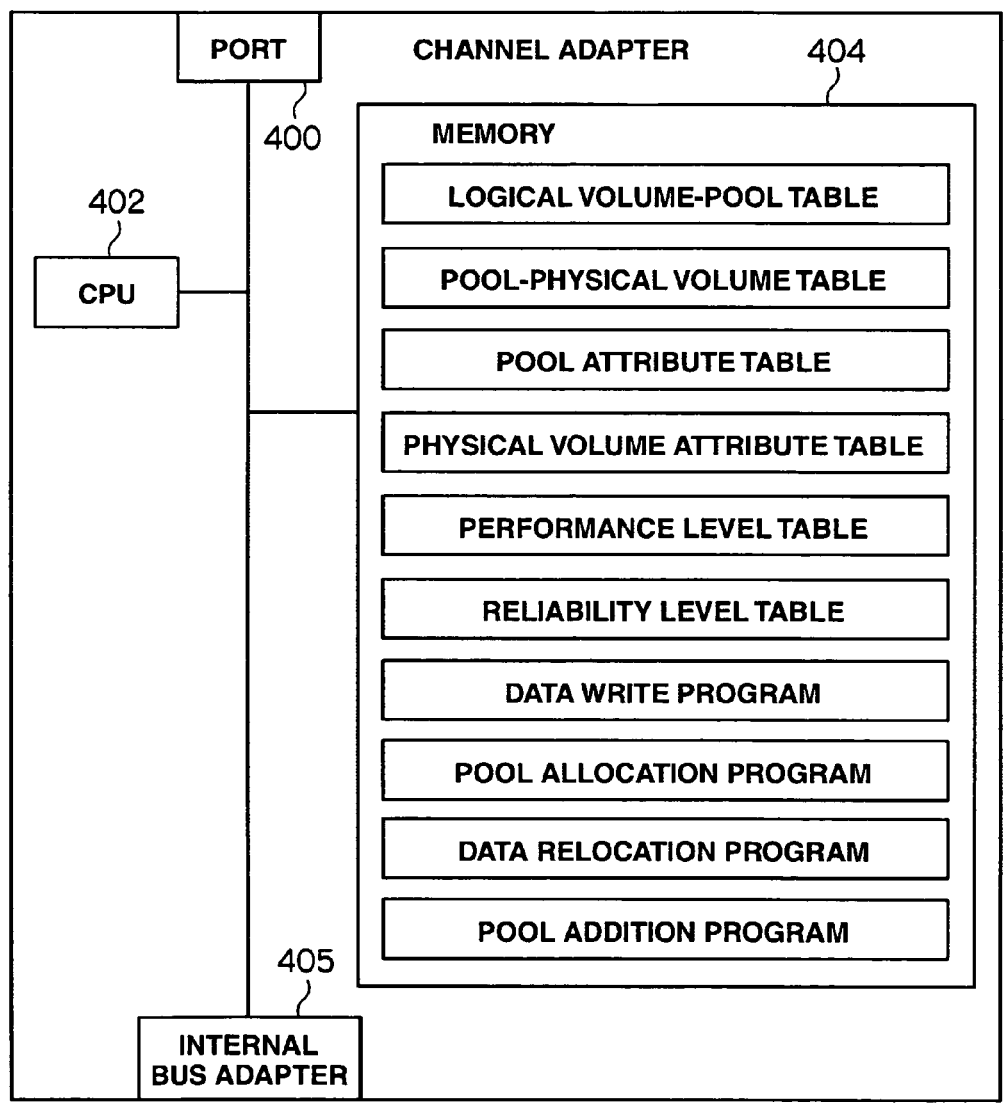
FIG. 4 is a hardware block diagram of a channel adapter of the storage controller.

FIG. 4 is a configuration example of a channel adapter of the storage controller of FIG. 3. The channel adapter has a port 400 for [connection with] the host, a CPU 402 for executing the control operation of the channel adapter, an internal bus adapter 403, and a local memory 404. The local memory 404 stores various control tables and control programs. The CPU 402 refers to these control tables and executes the control programs. The control tables and control programs will be sequentially explained later. Incidentally, the control tables may also be stored in the shared memory 120 of FIG. 1 so that they can be referred to by a plurality of channel adapters. The control tables are registered in the memory with the management processor 306 of FIG. 3. The management console 304 displays the GUI for creating control tables on a screen and provides this to the administrator.

FIG. 5 is a control table showing the correspondence between the logical volume (AOU volume) and pool. For example, FIG. 5 shows that logical volume IDs a0, a1 correspond to a pool ID 10. The pool ID 10 is providing a storage area to the AOU volumes a0 and a1. FIG. 6 is a control table showing the correspondence between the pool and physical volume. For example, physical volumes 100 to 102 are associated with the pool ID 10. FIG. 7 is a control table showing the attributes per pool. For example, the physical volume corresponding to the pool ID 10 has a RAID level of RAID 5, a drive type for providing the physical volume is a fibre channel (FC), rotating speed of the HDD model is 15000 rpm or faster, is an internal device in the controller 600, and the storage capacity of the physical volume is 36 GB. Incidentally, external High-end shows that it is a high-end class external storage controller to be connected to the storage controller 600, and external Mid-range shows that it is a mid-range class external storage controller to be connected to the storage controller 600. The greater the capacity, the channel adapter will recognize the storage device (storage area) as having high level attributes and policies (described later).

FIG. 8 is a physical volume attribute table. For example, the physical volume ID 100 has a RAID level of RAID 5, the drive type for providing a physical volume is FC, the HDD model is 15000 rpm, and the drive is connected inside the storage controller 600. An allocation flag is a control signal showing whether a physical volume has been associated with a certain pool. When the physical volume is associated with a certain pool, the flag is set to "1", and, when the physical volume is not associated with a pool or when released from the association with the pool, the flag is cleared to "0".

FIG. 9 is a table for leveling the performance, which is an attribute of the pool and physical volume. For example, performance level 1 is associated when the RAID level is RAID 1, the HDD model is 7200 rpm, and the connection type is external mid-range. Increase in the performance level shows that the performance of data writing or data reading between the host and storage controller is also high. For instance, this shows that the data writing speed and data reading speed are high. FIG. 10 is a table for leveling the reliability, which is an attribute of the pool and physical volume. For example, reliability level 1 is associated when the drive type is ATA, and the connection type is external mid-range.

Increase in the reliability level shows that the reliability of data writing or data reading between the host and storage controller is also high. For example, when the physical volume is located inside the external storage controller, if the FC-SW becomes defective, the storage controller 600 will not be able to access the physical volume of the external storage controller. Meanwhile, when the physical volume exists inside the storage controller 600, no such problem will arise.

Figure 11:
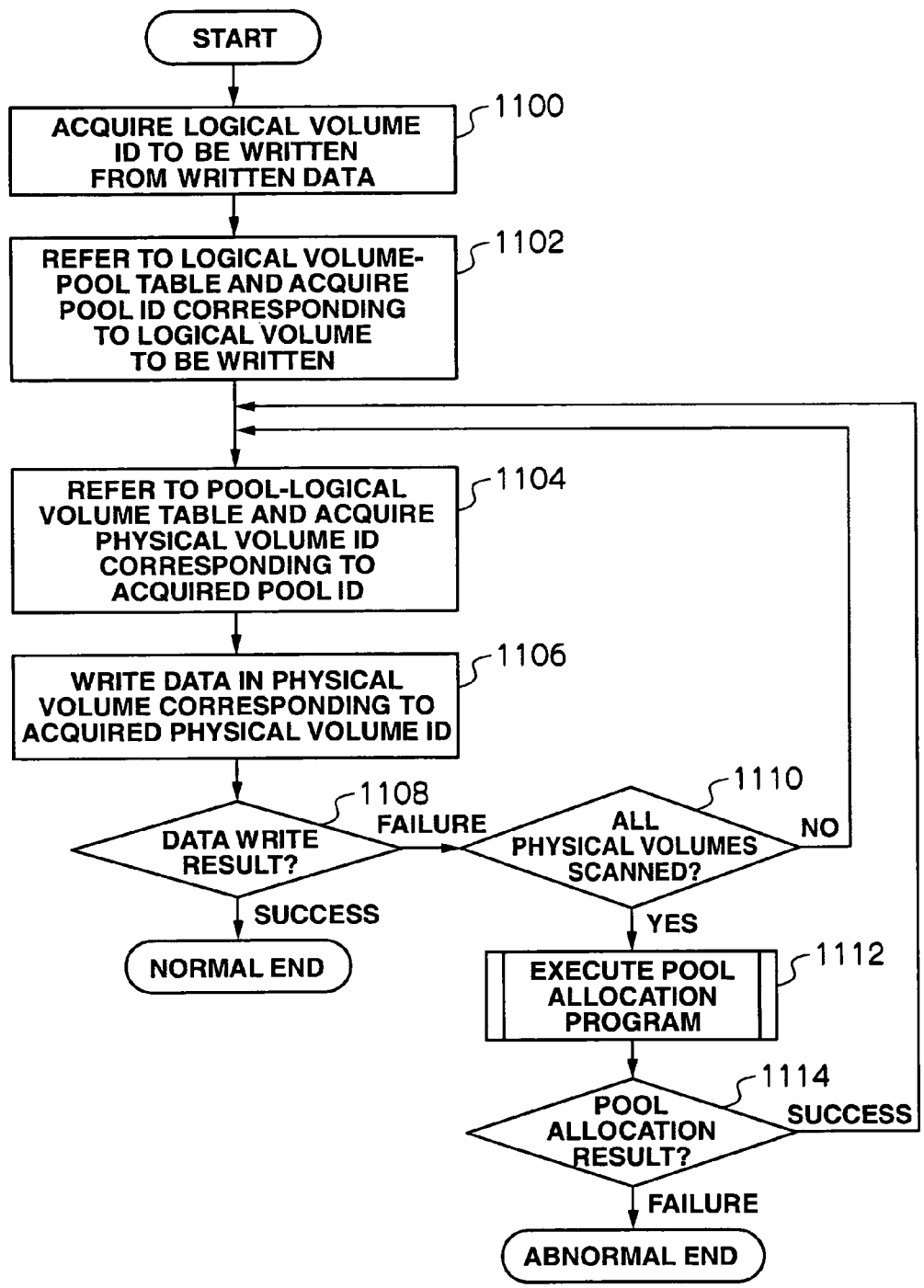
FIG. 11 is a flowchart showing the data write operation showing the writing of data from a host to an AOU volume.

FIG. 11 is a flowchart showing the data write operation showing the writing of data from a host to the AOU volume. The CPU 402 (FIG. 4) of the channel adapter executes this flowchart based on the data write program of the memory 404. The channel adapter acquires an ID of the AOU volume to be written from the write data from the host (1100). The channel adapter refers to the logical volume (AOU volume)-pool table shown in FIG. 5 and acquires the pool ID corresponding to the logical volume to be written (1102). The channel adapter refers to the pool physical volume table shown in FIG. 6 and acquires a physical volume ID included in the acquired pool ID (1104). Next, the channel adapter writes data in the physical volume corresponding to the acquired physical volume ID (1108).

The channel adapter receives the data write success/failure signal of the disk controller 140 (FIG. 1) and checks the data write result (1108). When the writing of data in the physical volume is successful, this flowchart is ended. When the data write is successful, the routine proceeds to step 1110, and executes steps 1104, 1106 and 1108 regarding the other physical volumes included in the acquired pool ID. When the writing of data in all physical volumes ends in failure, the routine proceeds to step 1112, and the channel adapter executes a program for adding a new physical volume to the pool. At step 1114, the channel adapter determines whether it was possible to add a new physical volume to the pool, and, when this is successful, it writes data in the newly added physical volume. When this determination is denied, the channel adapter abnormally ends the processing of FIG. 11. Here, it is necessary to add a new physical volume to the storage controller 600.

Figure 12:
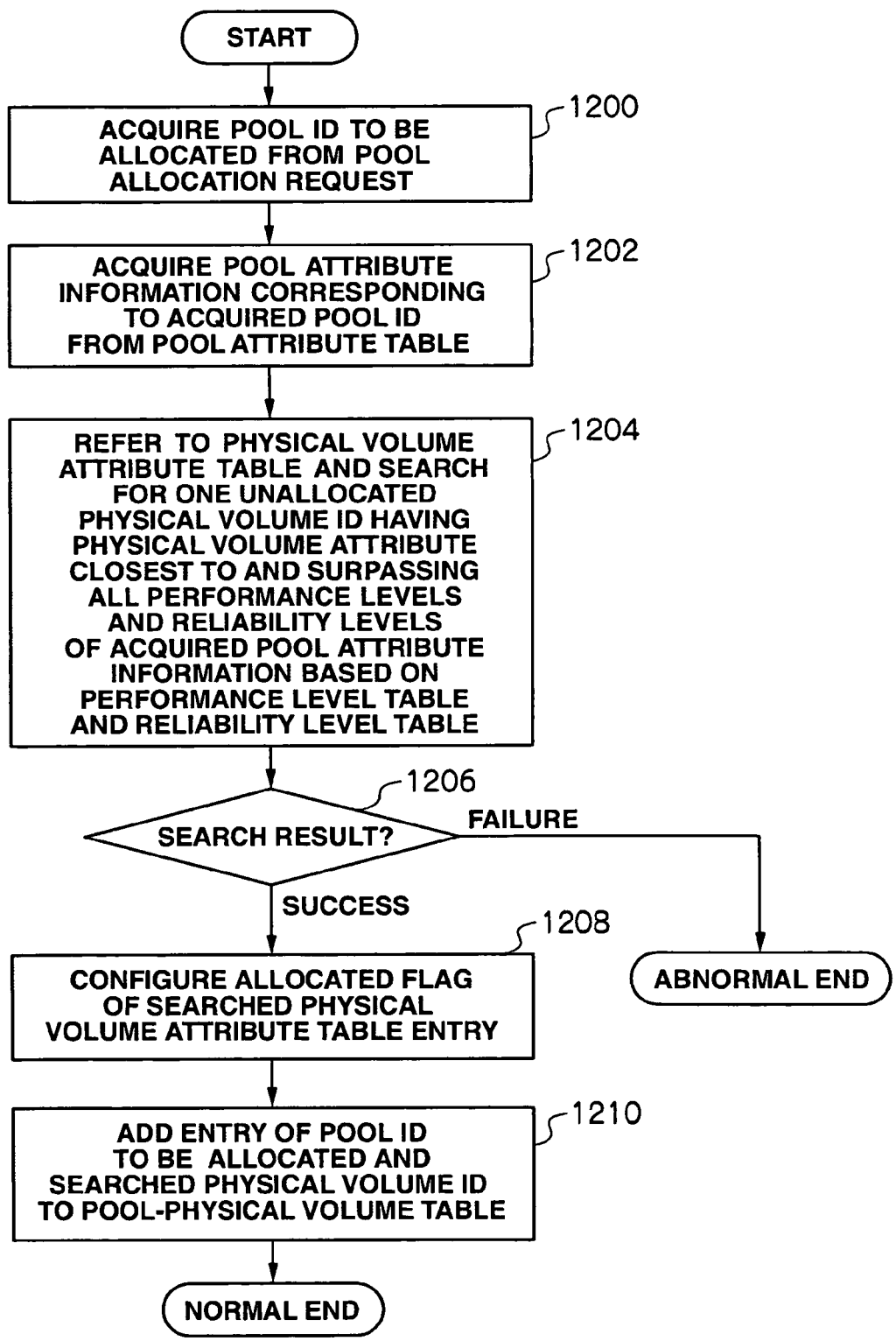
FIG. 12 is a flowchart showing the processing for adding a new physical volume to the pool.

FIG. 12 is a flowchart showing the processing for adding a new physical volume to the pool. The CPU 402 (FIG. 4) of the channel adapter executes this flowchart based on the pool allocation program of the memory 404. At step 1110 in FIG. 11, when there is no physical volume capable of storing write data issued from the host to the channel adapter in the pool, a pool allocation request flag is set in a prescribed area of a memory of the channel adapter, and the CPU 402 recognizes the setting of this flag and executes the flowchart of FIG. 12.

The channel adapter acquires a pool ID to which a physical volume is to be allocated from the pool allocation request (1200). The channel adapter acquires pool attribute information corresponding to the pool ID acquired from the pool attribute table (FIG. 7) (1202). The channel adapter refers to the physical volume attribute table (FIG. 8), and searches for one physical volume ID that has not been allocated to any pool (allocation flag is "0") having a physical volume attribute closest to and surpassing all performance levels and reliability levels of the acquired attribute information based on the performance level table (FIG. 9) and reliability level table (FIG. 10) (1204).

As a result of the search, when there is no corresponding physical volume, since it is necessary to configure a new physical volume in the storage controller 600, the channel adapter abnormally ends the flowchart of FIG. 12 (1206). As a result of the search, when a new physical volume already exists, the channel adapter proceeds to step 1208, and sets the allocated flag of the searched physical volume attribute table (FIG. 8) to "1". Next, the channel adapter adds an entry of an ID of the physical volume searched in the pool-physical volume table (FIG. 6) and the pool ID allocated with this physical volume.

Figure 13:
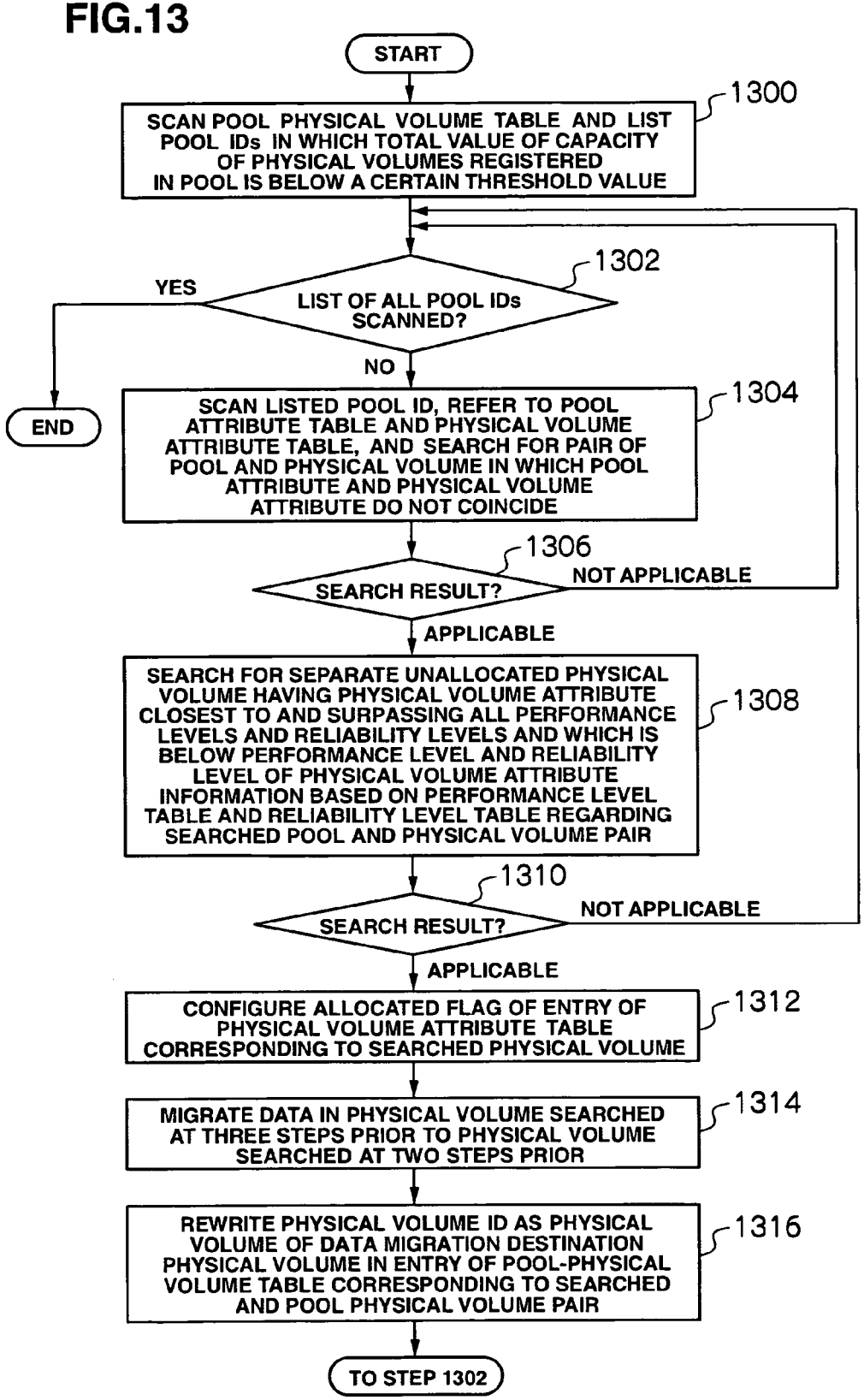
FIG. 13 is a flowchart showing the processing for changing a physical volume allocated to a certain pool to a physical volume allocated to another pool.

FIG. 13 is a flowchart showing the processing for changing a physical volume allocated to a certain pool to a physical volume allocated to another pool. The channel adapter executes this flowchart based on the data relocation program of the memory 404 of the CPU 404. The channel adapter scans the pool-physical volume table (FIG. 5), and lists pool IDs in which the total value of the remaining capacity, which is not storing data, of the physical volumes registered in the pool is below a certain threshold value. At step 1302, whether all listed pool IDs have been scanned is checked, and, when this is affirmed, the flowchart of FIG. 13 is ended.

At step 1304, the channel adapter scans one of the listed pool IDs, refers to the pool attribute table (FIG. 7) and physical volume attribute table (FIG. 8), and searches for a pool and physical volume pair in which the pool attribute and physical volume attribute do not coincide. At step 1306, whether such a pair exists is checked, and, when this pair cannot be found, this is considered to be "Not Applicable" and the processing of step 1304 is executed regarding another listed pool ID. When an applicable pair exists at step 1306, the routine proceeds to step 1308.

The channel adapter searches for a separate unallocated physical volume having a physical volume attribute closest to and surpassing all performance levels and reliability levels of the pool attribute information (FIG. 7) and which is below the performance level and reliability level of the physical volume attribute information based on the performance level table (FIG. 9) and reliability level table (FIG. 10) regarding the searched pool and physical volume pair.

In other words, when a physical volume having an attribute that is greater than the attribute value configured in the pool has been allocated to the pool, another physical volume that is exchangeable with this physical volume and which is not allocated to any pool is searched. Incidentally, the capacity of this physical volume shall be a sufficient capacity for increasing the capacity of the AOU volume. Information on the capacity of the physical volume is configured in the physical volume attribute table (FIG. 8). The channel adapter refers to this table and searches for a physical volume having a prescribed capacity.

As a result of this search, when a target physical volume does not exist, the routine returns to step 1302, and the channel adapter executes steps 1304 to 1308 regarding another pool ID, and, when there is a target step, the routine proceeds to step 1312 (1310). At step 1312, the channel adapter sets the allocated flag of the entry of the physical volume attribute table corresponding to the searched target physical volume to "1". At step 1314, the channel adapter migrates the data in the physical volume corresponding to the searched pool to the searched target physical volume.

At step 1316, the channel adapter rewrites the physical volume ID of the entry of the pool-physical volume table (FIG. 5) corresponding to the pair of the searched pool and physical volume as the physical volume ID of the data migration destination physical volume. The channel adapter executes the foregoing processes regarding all pool IDs listed at step 1300, and ends the processing of FIG. 13. As a result of the foregoing processing, when a physical volume of an excess attribute is allocated to a pool, such physical volume is released so as to allocate a physical volume matching the attribute of the pool. In other words, when the remaining capacity of the AOU volume falls below a certain threshold value, a new physical volume is added to the pool corresponding to the AOU volume.

Meanwhile, when a physical volume of an excessive attribute exists in a pool, this physical volume is released, the correspondence with the pool is cleared, and preparation is made for allocation to another pool in which the requested attribute is high. Incidentally, it is also possible to change the flowchart of FIG. 13 and only add a new physical volume to the pool when the remaining storage capacity of the pool falls below a certain threshold value (for example, 10% of the total storage capacity of the pool). In order to secure a physical volume that has not yet been allocated to a pool, when the channel adapter is not able to discover such a physical volume, the channel adapter executes the flowchart shown in FIG. 14.

When the storage capacity of the pool falls below a certain threshold value, the channel adapter may alert and notify the administrator that the processing of FIG. 13 is being executed. Further, when there is shortage in the physical volume to be allocated to the pool with insufficient capacity; that is, when there is shortage in the storage capacity of the physical volume, the channel adapter may also alert and notify the administrator that it is necessary to add a new physical volume to the storage controller 600. The capacity of the physical volume to be added to the pool may be fixed to a certain value, or the capacity of the physical volume may be changed according to the remaining capacity of the pool. Further, in accordance with the request made by the AOU volume, the total storage capacity of the pool and the total storage capacity of the physical volume to be allocated to the AOU volume may be suitably configured or suitably changed.

As measures for adding a physical volume to the storage controller 600, there is a case of adding a new hard disk to the storage controller 600, and a case of mapping a physical volume in the external storage controller to the storage controller 600. The flowchart of FIG. 13 is desirably executed in prescribed cycles. Meanwhile, the channel adapter may also specify the pool in which the remaining storage capacity fell below a certain threshold value, and perform physical volume addition processing only to this pool. When there is shortage in the remaining storage capacity regarding a plurality of AOU volumes, addition of the physical volume is preferentially performed regarding the pool corresponding to the preferential AOU volume.

Priority of the AOU volume is quantified, and stored in the memory in the form of a control table. The channel adapter checks the priority, and executes the addition of the physical volume from the pool of the AOU volume with the highest priority. The channel adapter may check the access frequency from the host to the AOU volume, and determine the AOU volume having high access frequency to be a volume with high priority. The channel adapter may also allocate more physical volumes or allocate physical volumes with greater capacity to the pool of the AOU volume having a high access frequency from the host. Incidentally, the administrator may suitably decide the scale of priority. In addition to the examples described above, volumes for clients may be given priority, volumes for the internal accounting department may be given priority, and so on.

Figure 14:
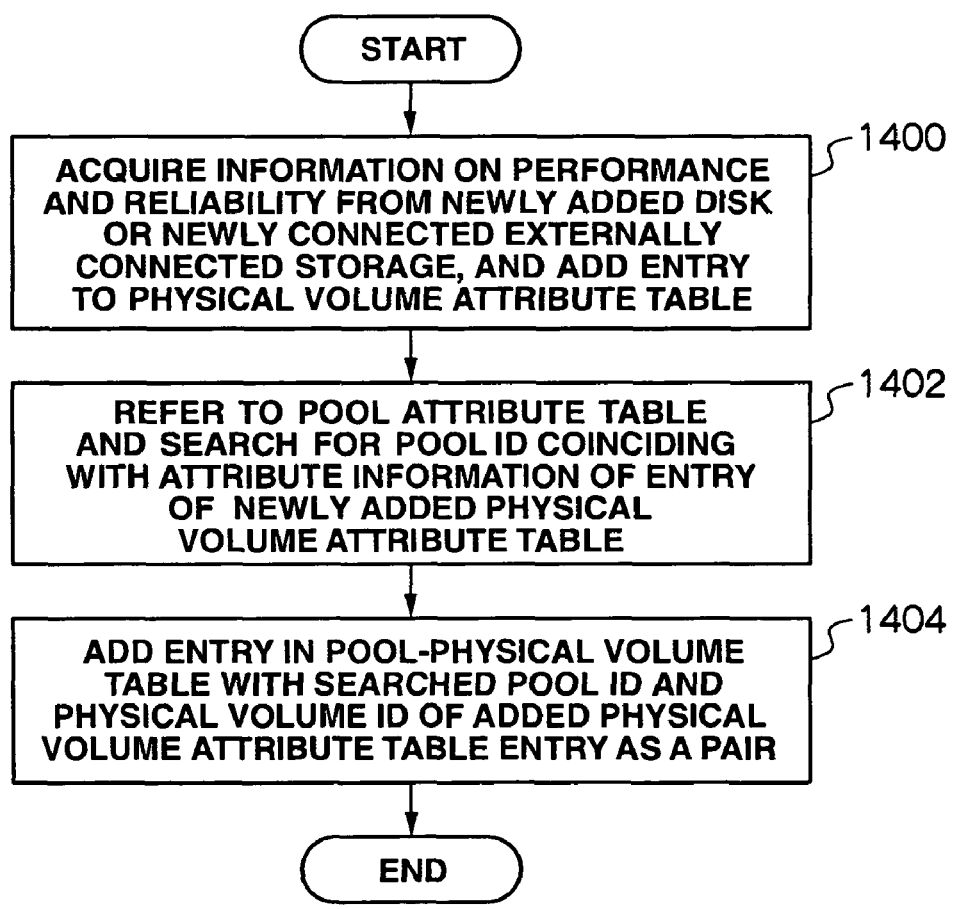
FIG. 14 is a flowchart for adding a physical volume to a storage controller.

The channel adapter executes the flowchart of FIG. 14 according to the pool addition program of the memory 404. At step 1400, the channel adapter acquires information relating to the performance and reliability from the newly added disk or newly connected externally connected storage, and adds an entry in the physical volume attribute table (FIG. 8). At step 1402, the [chapter adapter] refers to the pool attribute table (FIG. 7), and searches for a pool ID coinciding with the attribute information of newly added physical volume attribute table entry. Here, the searched pool ID is preferably a pool in which the remaining storage capacity fell below a certain threshold value.

The channel adapter adds an entry in the pool-physical volume table with the searched pool ID and physical volume ID of the added physical volume attribute table entry as a pair (1404). As a result of the foregoing processing, it is possible to associate the newly configured physical volume with the AOU volume with insufficient remaining storage capacity. Incidentally, addition of a new physical volume to the storage controller 600 can be conducted periodically, or it is also possible to monitor the remaining storage capacity of all AOU volumes, or monitor the write access frequency from the host to all AOU volumes, and enter the physical volumes that cannot be allocated to the pool in the physical volume attribute table (FIG. 8).

Figure 15:
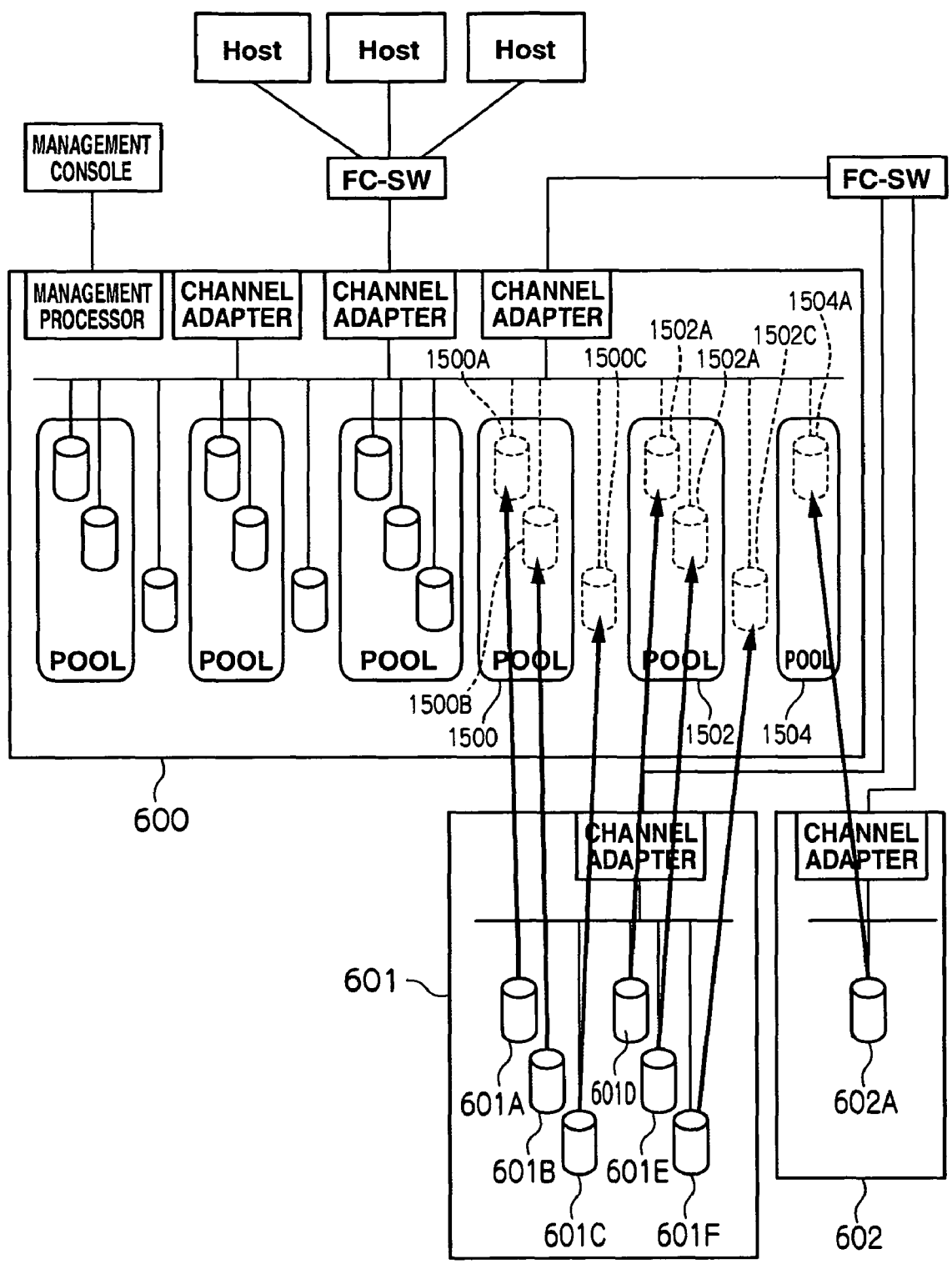
FIG. 15 is a hardware block diagram showing a situation where a physical volume of a second storage controller is being mapped to a first storage controller.

FIG. 15 is a hardware block diagram showing a situation where a physical volume of the external storage controller is being mapped to the storage controller 600. Pools 1500, 1502, 1504 are associated with the AOU volume. Virtual volumes 1500A, 1500B are allocated to the pool 1500. Virtual volumes 1500C and 1502C do not belong to a pool. Virtual volumes 1502A and 1502B belong to the pool 1502. A virtual 1504A belongs to the pool 1504. Physical volumes 601A to 601F are actual physical volumes in the external storage controller 601.

FIG. 15 also illustrates another external storage controller 602 and another actual physical volume 602A. The physical volume of the external storage controller, as shown with the arrow in FIG. 15, is mapped to the virtual volume of the first storage controller 600. Data to be written in the virtual volume may be stored in the physical volume in the external storage controller mapped to the virtual volume. The storage controller 600 has a mapping table showing the correspondence of the virtual volume, and the physical volume of the external storage controller to be mapped to such virtual volume. The channel adapter forms a path of the virtual volume and internal volume and performs zoning configuration to the FC-SW in order to execute mapping of the virtual volume, and the physical volume (physical storage area) as the internal volume of the external storage controller. The channel adapter refers to this mapping table, and stores write data in the physical volume corresponding to this virtual volume. The external storage controllers 601 and 602 correspond to the second storage controller claimed in the claims.

Figure 16:
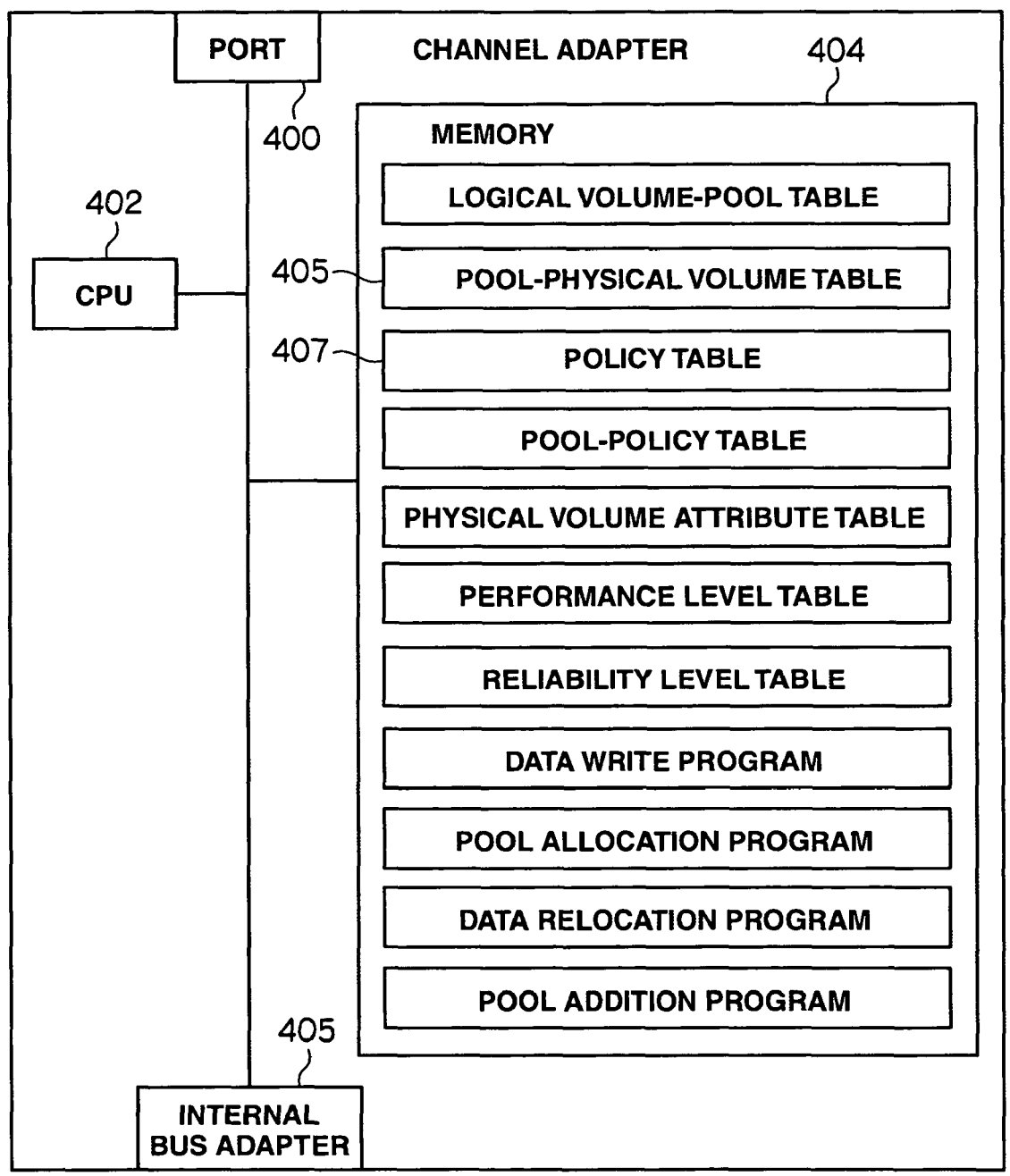
FIG. 16 is a hardware block diagram of a channel adapter of a storage controller according to the second embodiment.

Next, another embodiment is explained. In the explanation of another embodiment, only the portions that are different from the foregoing embodiment will be explained. Components and processing operations that are the same as those of the foregoing embodiment are respectively given the same reference numeral, and the explanation thereof is omitted. FIG. 16 is a modified example of FIG. 4, and differs from the foregoing embodiment shown in FIG. 4 in that a pool policy table 405 and a policy table 407 are added as new control tables in the memory 404. FIG. 17 shows a policy table. Here, a policy is an index of an attribute that is common to the pool and physical volume. As policies, as shown in FIG. 17, there are the indexes of high performance/high reliability, emphasis on performance, emphasis on reliability, backup, and archive. The content of each policy is as shown in FIG. 17. When taking "high performance, high reliability" as the example, the RAID level requirement is RAID+1 or higher, the drive type is FC or greater, the HDD model requirement is 15000 rpm or faster, and the drive connection type is internal as the contents of the "high performance, high reliability" policy.

FIG. 18 is a pool policy table, and the pool ID and policy are associated. Each policy is encoded, and, by checking this code, the channel adapter is able to allocate a physical volume coinciding with the policy configured in the pool to the target pool.

Figure 19:
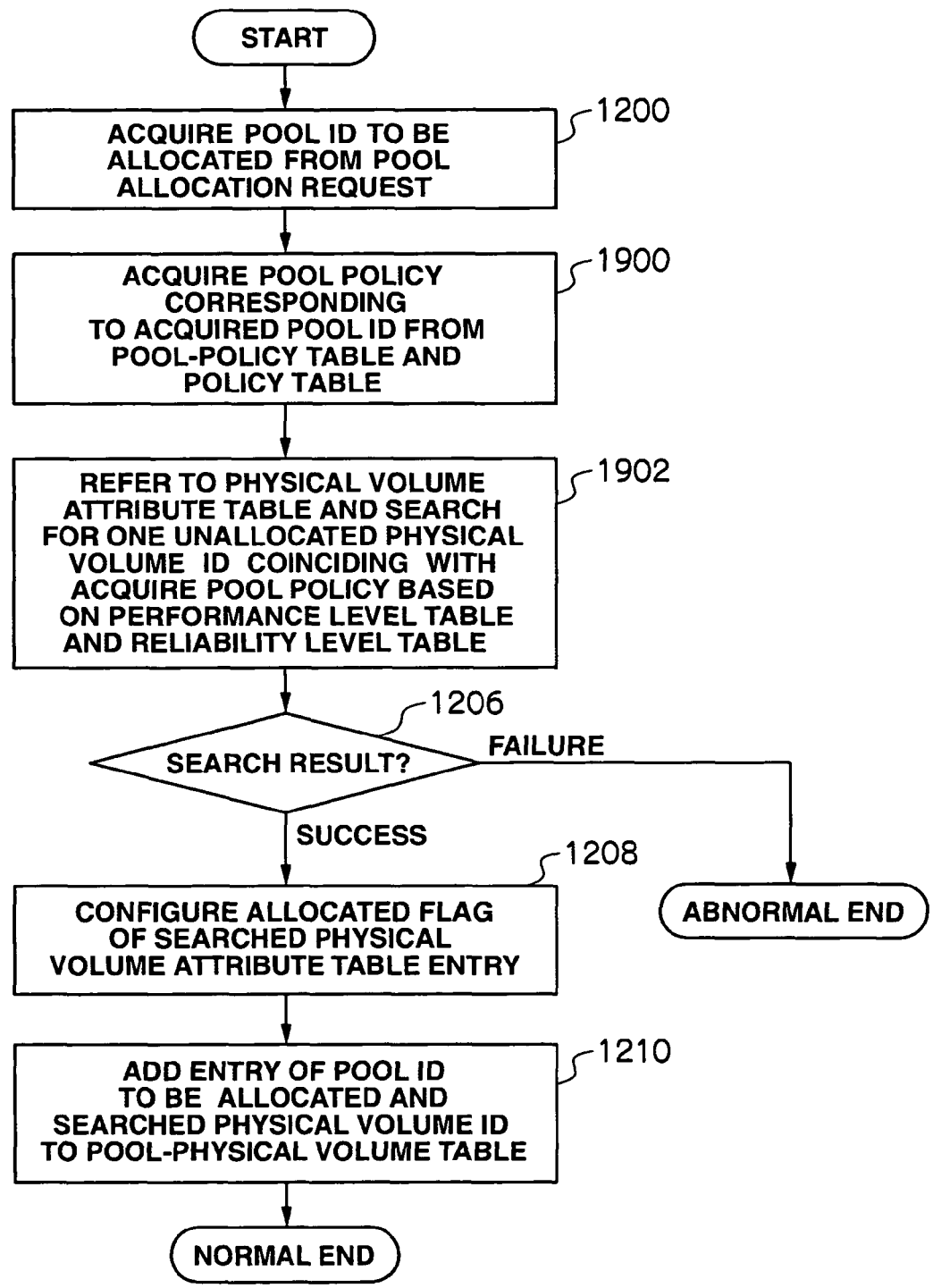
FIG. 19 is a flowchart showing the processing for adding a new physical volume to the pool according to the second embodiment.

The flowchart shown in FIG. 19 differs from the flowchart shown in FIG. 12 at step 1900 and step 1902. At step 1900, the channel adapter acquires a pool policy corresponding to the acquired pool ID from the pool-policy table (FIG. 17) and policy table (FIG. 18). At step 1902, the channel adapter refers to the physical volume attribute table, and searches for one unallocated physical volume ID that coincides with the acquired pool policy based on the performance level table and reliability level table. In other words, with the flowchart of FIG. 19, a physical volume with an attribute coinciding with a certain policy is searched based on this policy and allocated to the pool to which the policy is configured.

Figure 20:
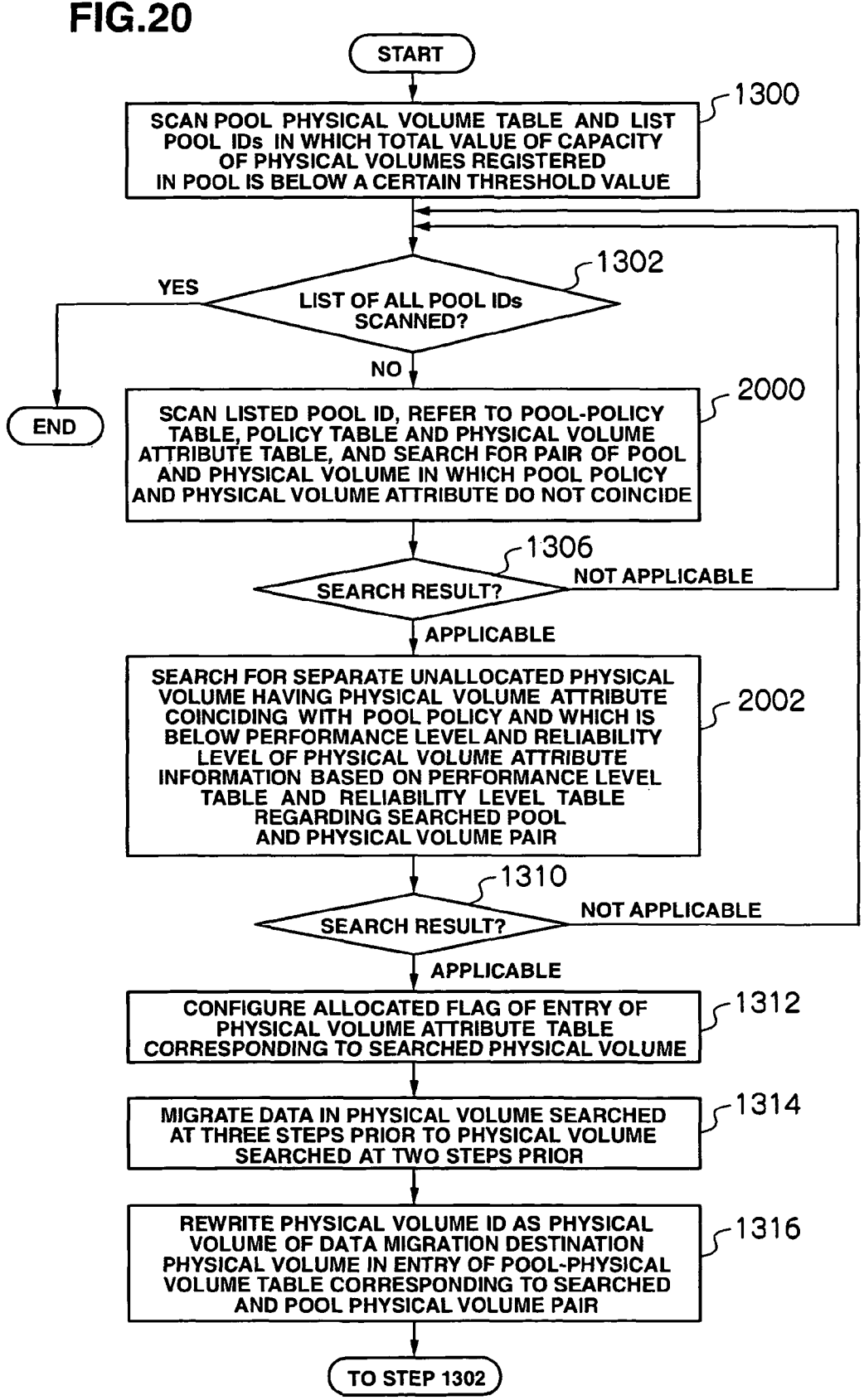
FIG. 20 is a flowchart showing the processing for changing a physical volume allocated to a certain pool to a physical volume allocated to another pool according to the second embodiment.

The flowchart shown in FIG. 20 differs from the flowchart shown in FIG. 13 at step 2000 and step 2002. The channel adapter specifies a physical volume to be allocated to a pool based on a policy instead of a pool attribute. At step 2000, the channel adapter scans the listed pool IDs, refers to the pool-policy table, policy table and physical volume attribute table, and searches for the pool and physical volume pair in which the pool policy and physical volume attribute do not coincide. At step 2002, the channel adapter searches for a separate unallocated physical volume having a physical volume attribute coinciding with a pool policy and which is below the performance level and reliability level of the physical volume attribute information based on the performance level table and reliability level table regarding the searched pool and physical volume pair.

Figure 21:
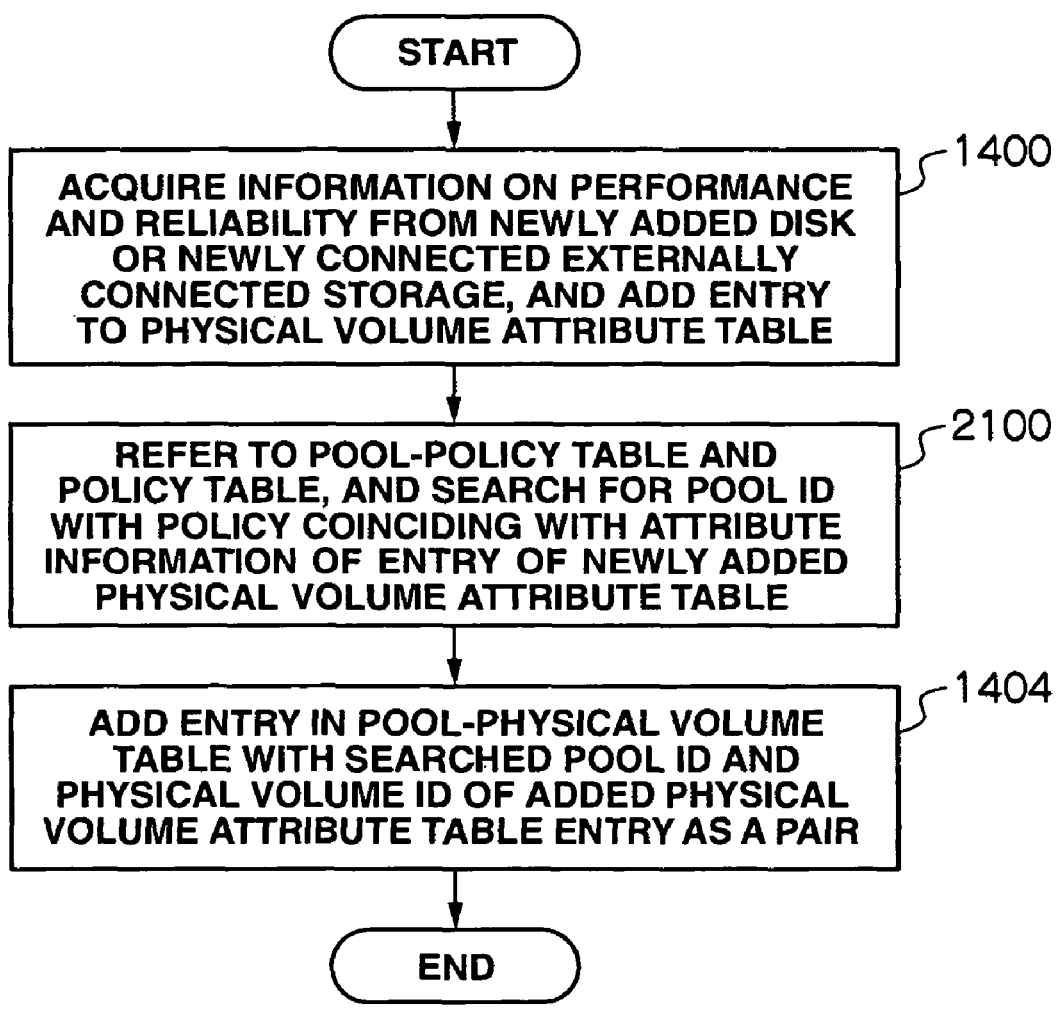
FIG. 21 is a flowchart for adding a physical volume to a storage controller according to the second embodiment.

The flowchart shown in FIG. 21 differs from the flowchart shown in FIG. 14 at step 2100. At step 2100, the channel adapter refers to the pool-policy table and policy table, and searches for a pool ID having a policy coinciding with the attribute information of the newly added physical volume attribute table entry. As a result of the FIG. 16 to FIG. 21 described above, the physical volume can be selected based on a pool policy instead of a pool attribute. Incidentally, the foregoing policy may be used as the index for the physical volume instead of the physical volume attribute.

Figure 22:
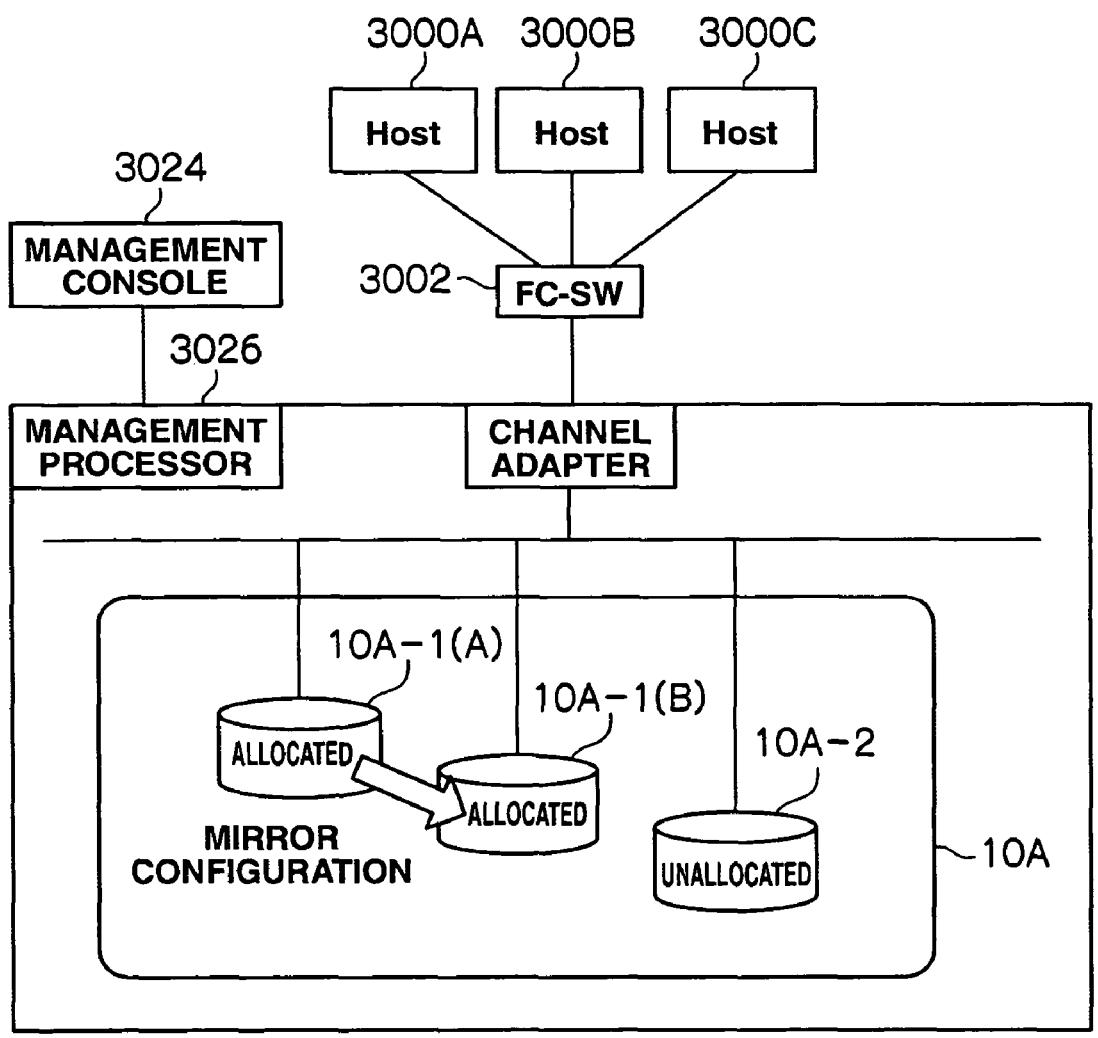
FIG. 22 is a block diagram showing a state a mirror configuration is adopted in a plurality of physical volumes.

Next, another embodiment of the present invention is explained. FIG. 22 is a system configuration showing this embodiment. The configuration of FIG. 22 is the same as the configuration of FIG. 3 other than that the internal configuration of the pool 10A of FIG. 3 differs as described below. 10A-1(B) in the pool 10A is a mirror volume of 10A-1(A). The write volume of the host system 3000A is written in the primary volume 10A-1(A), and data of the primary volume 10A-1(A) is synchronously copied to the secondary volume 10A-1(B). 10A-2 is a physical volume to which a mirror volume has not been allocated.

When there is shortage in the pool capacity and the channel adapter is to allocate a new storage area to the volume in the pool, if there is no shortage in the storage area to be added, storage area is allocated to the primary volume and secondary volume equally. Meanwhile, when there is not enough storage area to be allocated, the primary volume is given priority for allocation. As described above, the storage area to be allocated to the primary volume is based on the storage device to which an attribute configured in the pool or an attribute greater than the policy has been configured. When there is shortage in the storage capacity to be allocated to the pool, the channel adapter may clear the copy-pair relationship of the primary volume and secondary volume, and allocate the storage area of the secondary volume to the primary volume.

In the foregoing embodiments, although an attribute was configured in a pool so as to limit the physical volume to be allocated to the pool, it is also possible to allocate an attribute to the AOU volume and select the pool to be allocated to the AOU volume. Further, in the foregoing embodiments, when there is no drive coinciding with the attribute configured in the pool, it is also possible to associate the drive of an attribute that is superior to the attribute configured in the pool with such pool. For example, if the attribute of the pool a0 is a drive of SATA or higher, and there is no SATA drive, the FC drive may be allocated to the pool a0. When the SATA drive is added to the storage controller, the FC drive may be released from the pool a0 and the SATA drive may be allocated to the pool a0. Incidentally, attributes and policies are parameters relating to the performance, specification or request of the storage device that can be suitably configured or decided by the administrator or user. The storage controller determines the attribute or policy based on these parameters. In the foregoing embodiments, although an attribute and policy were explained as an aggregate of a plurality of factors relating to the RAID level and performance level, any one or two of the foregoing factors may be made to the attributes and/or policies. Further, the foregoing embodiments may also be suitably combined.

I claim

1. A storage system adapted to be coupled to a plurality of host computers, comprising:
a plurality of drives; and
a controller managing a plurality of allocation on use (AOU) volumes to be provided to said plurality of host computers as superficial storage capacities, a plurality of storage areas provided from the plurality of drives, and a plurality of storage area groups including a first storage area group having a first attribute and including a plurality of first storage areas of said plurality of storage areas to be allocated to a first AOU volume of said plurality of AOU volumes, a second storage area group having a second attribute and including a plurality of second storage areas of said plurality of storage areas to be allocated to a second AOU volume of said plurality of AOU volumes, and a third storage area group including a plurality of third storage areas of said plurality of storage areas that are not included in either said first storage area group or said second storage area group,
wherein said plurality of first storage areas of said first storage area group are provided from a plurality of first type drives among said plurality of drives, said plurality of second storage areas of said second storage area group are provided from a plurality of second type drives among said plurality of drives and said plurality of third storage areas of said third storage area group are plural kinds of storage areas provided from said plurality of first type drives and said plurality of second type drives among said plurality of drives,
wherein an attribute of said plurality of first storage areas corresponds to at least a drive type of said plurality of first type drives and complies with said first attribute of said first storage area group, and an attribute of said plurality of second storage areas corresponds to at least a drive type of said plurality of second type drives and complies with said second attribute of said second storage area group, wherein said first attribute corresponds to at least a performance or reliability that is different from that of said second attribute,
wherein after providing said first AOU volume, at least a part of said first AOU volume is allocated at least a part of said first storage areas to be able to store data received from at least one of said host computers, and wherein after providing said second AOU volume, at least a part of said second AOU volume is allocated at least a part of said second storage areas to be able to store data received from at least one of said host computers;
wherein said controller is adapted to:
if an unused storage capacity of said first storage area group is below a first threshold value, add, to said first storage area group, a fourth storage area which is provided from said third storage area group, wherein an attribute of said fourth storage area corresponds to at least said drive type of said plurality of first type drives and complies with said first attribute of said first storage area group; and
if an unused storage capacity of said second storage area group is below a second threshold value, add, to said second storage area group, a fifth storage area which is provided from said third storage area group, wherein an attribute of said fifth storage area corresponds to at least said drive type of said plurality of second type drives and complies with said second attribute of said second storage area group.

2. The storage system according to claim 1,
wherein said controller is adapted to allocate the at least the part of said plurality of first storage areas of said first storage area group to said first AOU volume in response to a first write command targeted to said first AOU volume; and
wherein said controller is adapted to allocate the at least the part of said second plurality of storage areas of said second storage area group to said second AOU volume in response to a second write command targeted to said second AOU volume.

3. The storage system according to claim 1;
wherein said plurality of first storage areas and said fourth storage area are physical volumes provided from said first type drives; and
wherein said plurality of second storage areas and said fifth storage area are physical volumes provided from said second type drives.

4. The storage system according to claim 1,
wherein said plurality of first type drives are Fibre Channel (FC) drives, and
wherein said plurality of second type drives are AT Attachment (ATA) drives.

5. The storage system according to claim 3,
wherein each of said physical volumes is provided from plural drives configuring a RAID group.

6. The storage system according to claim 1,
wherein said first attribute indicates that storage areas included in said first storage area group should be provided from said plurality of first type drives.

7. The storage system according to claim 6,
wherein said second attribute indicates that storage areas included in said second storage area group should be provided from said plurality of second type drives.

8. The storage system according to claim 1;
wherein said first storage area group is associated with said first AOU volume, and wherein said second storage area group is associated with said second AOU volume.

9. A storage system adapted to be coupled to a host computer, comprising:
a plurality of drives; and
a controller managing a first logical volume and a second logical volume to be provided to said host computer, a plurality of storage area groups including a first storage area group having a first feature and including a plurality of first storage areas, provided from the plurality of drives, to be allocated to said first logical volume, a second storage area group having a second feature and including a plurality of second storage areas, provided from the plurality of drives, to be allocated to said second logical volume, and a third storage area group including a plurality of third storage areas that are not included in either said first storage area group or said second storage area group,
wherein said plurality of first storage areas of said first storage area group are provided from a plurality of first type drives among said plurality of drives, said plurality of second storage areas of said second storage area group are provided from a plurality of second type drives among said plurality of drives, and said plurality of third storage areas of said third storage area group have plural kinds of storage areas provided from said plurality of drives,
wherein a feature of said plurality of first storage areas corresponds to at least a drive type of said plurality of first type drives and complies with said first feature of said first storage area group, and a feature of said plurality of second storage areas corresponds to at least a drive type of said plurality of second type drives and complies with said second feature of said second storage area group, wherein said first feature corresponds to at least a performance or reliability that is different from that of said second feature, wherein:

said first logical volume has a first superficial storage capacity and, after providing said first logical volume, at least a part of said first logical volume is, if necessary, allocated at least a part of said plurality of first storage areas for storing data received from said host computer, a size of said first superficial storage capacity is larger than a size of the at least a part of said first storage areas, said second logical volume has a second superficial storage capacity and, after providing said second logical volume, at least a part of said second logical volume is, if necessary, allocated at least a part of said plurality of second storage areas for storing data received from said host computer, a size of said second superficial storage capacity is larger than a size of the at least a part of said second storage areas, wherein said controller:

if a remaining storage capacity of said first storage area group is below a first threshold value, adds, to said first storage area group, a fourth storage area which is provided from said plurality of first type drives among said plurality of drives, wherein a feature of said fourth storage area corresponds to at least said drive type of said plurality of first type drives and complies with said first feature of said first storage area group; and if a remaining storage capacity of said first storage area group is below a second threshold value, adds, to said second storage area group, a fifth storage area which is provided from said plurality of second type drives among said plurality of drives, wherein a feature of said fifth storage area corresponds to at least said drive type of said plurality of second type drives and complies with said second feature of said second storage area group.

10. The storage system according to claim 9, wherein said controller allocates the at least the part of said plurality of first storage areas of said first storage area group to said first logical volume in response to a first write command targeted to said first logical volume from said host computer; and wherein said controller allocates the at least the part of said plurality of second storage areas of said second storage area group to said second logical volume in response to a second write command targeted to said second logical volume from said host computer.

11. The storage system according to claim 9;
wherein said plurality of first storage areas and said fourth storage area are physical volumes provided from said plurality of first type drives;
wherein said plurality of second storage areas and said fifth storage area are physical volumes provided from said plurality of second type drives.

12. The storage system according to claim 9, wherein said plurality of first type drives are Fibre Channel (FC) drives, and wherein said plurality of second type drives are AT Attachment (ATA) drives.

13. The storage system according to claim 11, wherein each of said physical volumes is provided from plural drives configuring a RAID group.

14. The storage system according to claim 9, wherein said first feature indicates that storage areas included in said first storage area group should be provided from said plurality of first type drives.

15. The storage system according to claim 14, wherein said second feature indicates that storage areas included in said second storage area group should be provided from said plurality of second type drives.

16. The storage system according to claim 9;
wherein said first storage area group is associated with said first logical volume, and
wherein said second storage area group is associated with said second logical volume.

17. A method for a storage system comprising:

a step for managing a plurality of storage area groups including a first storage area group having a first attribute, a second storage are group having a second attribute and a third storage area group, said first storage area group having a plurality of first storage areas provided from a plurality of first type drives among a plurality of drives, said second storage area group having a plurality of second storage areas provided from a plurality of second type drives among said plurality of drives, said third storage area group having a plurality of third storage areas as plural kinds of storage areas provided from said plurality of drives, said plurality of third storage areas not being included in either said first storage area group or said second storage area group, wherein an attribute of said plurality of first storage areas corresponds to at least a drive type of said plurality of first type drives and complies with said first attribute of said first storage area group, and an attribute of said plurality of second storage areas corresponds to at least a drive type of said plurality of second type drives and complies with said second attribute of said second storage area group;

a step for providing a first allocation on use (AOU) volume and a second AOU volume to a plurality of host computers as first and second superficial storage capacities, wherein said first and second AOU volumes are to be allocated storage areas from said first and second storage area groups, respectively, wherein after providing said first AOU volume, at least a part of said first AOU volume is allocated at least a part of said first storage areas for storing data received from at least one of said host computers, and wherein after providing said second AOU volume, at least a part of said second AOU volume is allocated at least a part of said second storage areas for storing data received from at least one of said host computers;

a step, if an unallocated storage capacity of said first storage area group is below a first threshold value, for adding, to said first storage area group, a fourth storage area which is provided from said plurality of first type drives among said plurality of drives, wherein an attribute of said fourth storage area corresponds to at least said drive type of said plurality of first type drives and complies with said first attribute of said first storage area group; and a step, if an unallocated storage capacity of said second storage area group is below a second threshold value, for adding, to said second storage area group, a fifth storage area which is provided from said plurality of second type drives among said plurality of drives, wherein an attribute of said fifth storage area corresponds to at least a drive type of said plurality of second type drives and complies with said second attribute of said second storage area group, wherein said first attribute corresponds to at least a performance or reliability that is different from that of said second attribute.

18. The method for a storage system according to claim 17, further comprising:
- a step for allocating the at least the part of said plurality of first storage areas of said first storage area group to said first AOU volume in response to a first write command targeted to said first AOU volume; and
- a step for allocating the at least the part of said plurality of second storage areas of said second storage area group to said second AOU volume in response to a second write command targeted to said second AOU volume.

19. The method for a storage system according to claim 17, wherein:
- said plurality of first storage areas and said fourth storage area are physical volumes provided from said plurality of first type drives; and
- said plurality of second storage areas and said fifth storage area are physical volumes provided from said plurality of second type drives.

20. The method for a storage system according to claim 17, wherein said plurality of first type drives are Fibre Channel (FC) drives, and
wherein said plurality of second type drives are AT Attachment (ATA) drives.

21. The method for a storage system according to claim 19, wherein each of said physical volumes is provided from plural drives configuring a RAID group.

22. The storage system according to claim 17,
wherein said first attribute indicates that storage areas included in said first storage area group should be provided from said plurality of first type drives.

23. The storage system according to claim 22,
wherein said second attribute indicates that storage areas included in said second storage area group should be provided from said plurality of second type drives.

24. The storage system according to claim 17,
wherein said first storage area group is associated with said first AOU volume, and
wherein said second storage area group is associated with said second AOU volume.

25. A computer program stored in a computer readable storage medium and executable by a storage system, the computer program comprising:
- code for managing a plurality of storage area groups including a first storage area group having a first attribute, a second storage area group having a second attribute and a third storage area group, said first storage area group including a plurality of first storage areas provided from a plurality of first type drives among a plurality of drives, said second storage area group including a plurality of second storage areas provided from a plurality of second type drives among said plurality of drives, said third storage area group including a plurality of third storage areas as plural kinds of storage areas provided from said plurality of drives, said plurality of third storage areas not being included in either said first storage area group or said second storage area group, wherein an attribute of said plurality of first storage areas corresponds to at least a drive type of said plurality of first type drives and complies with said first attribute of said first storage area group, and an attribute of said plurality of second storage areas corresponds to at least a drive type of said plurality of second type drives and complies with said second attribute of said second storage area group;
- code for providing a first allocation on use (AOU) volume and a second AOU volume to a plurality of host computers as first and second superficial storage capacities, wherein said first and second AOU volumes are to be allocated storage areas from said first and second storage area groups, respectively, wherein after providing said first AOU volume, at least a part of said first AOU volume is allocated at least a part of said plurality of first storage areas for storing data received from at least one of said host computers, and wherein after providing said second AOU volume, at least a part of said second AOU volume is allocated at least a part of said plurality of second storage areas for storing data received from at least one of said host computers;
- code, if a remaining storage capacity of said first storage area group is below a first threshold value, for adding, to said first storage area group, a fourth storage area which is provided from said plurality of first type drives among said plurality of drives, wherein an attribute of said fourth storage area corresponds to at least said drive type of said plurality of first type drives and complies with said first attribute of said first storage area group; and
- code, if a remaining storage capacity of said second storage area group is below a second threshold value, for adding, to said second storage area group, a fifth storage area which is provided from said plurality of second type drives among said plurality of drives, wherein an attribute of said fifth storage area corresponds to at least said drive type of said plurality of second type drives and complies with said second attribute of said second storage area group,
wherein said first attribute corresponds to at least a performance or reliability that is different from that of said second attribute.

26. The computer program according to claim 25, further comprising:
- code for allocating the at least the part of said plurality of first storage areas of said first storage area group to said first AOU volume in response to a first write command targeted to said first AOU volume; and
- code for allocating the at least the part of said plurality of second storage areas of said second storage area group to said second AOU volume in response to a second write command targeted to said second AOU volume.

27. The computer program according to claim 25,
wherein said plurality of first storage areas and said fourth storage area are physical volumes provided from said plurality of first type drives;
wherein said plurality of second storage areas and said fifth storage area are physical volumes provided from said plurality of second type drives.

28. The computer program according to claim 25, wherein said plurality of first type drives are Fibre Channel (FC) drives, and wherein said plurality of second type drives are AT Attachment (ATA) drives.

29. The computer program according to claim 27,
wherein each of said physical volumes is provided from plural drives configuring a RAID group.

30. The computer program according to claim 25,
wherein said first attribute indicates that storage areas included in said first storage area group should be provided from said plurality of first type drives.

31. The computer program according to claim 30,
wherein said second attribute indicates that storage areas included in said second storage area group should be provided from said plurality of second type drives.

32. The computer program according to claim 25,
wherein said first storage area group is associated with said first AOU volume, and wherein said second storage area group is associated with said second AOU volume.

33. A storage system adapted to be coupled to a plurality of host computers, comprising:
a plurality of drives; and
a controller managing a plurality of logical volumes to be provided to said plurality of host computers as superficial storage capacities and a plurality of storage area groups including a first storage area group having a first feature and including a plurality of first storage areas, provided from the plurality of drives, to be allocated to a first logical volume of said plurality of logical volumes, a second storage area group having a second feature and including a plurality of second storage areas, provided from the plurality of drives, to be allocated to a second logical volume of said plurality of logical volumes, and a third storage area group including plurality of third storage areas,
wherein said plurality of first storage areas are provided from a plurality of first type drives among said plurality of drives, said plurality of second storage areas are provided from a plurality of second type drives among said plurality of drives, and said plurality of third storage areas include plural kinds of storage areas provided from first type drives and second type drives among said plurality of drives and are not included in either said first storage area group or said second storage area group,
wherein a feature of said plurality of first storage areas corresponds to at least a drive type of said plurality of first type drives and complies with said first feature of said first storage area group, and a feature of said plurality of second storage areas corresponds to at least a drive type of said plurality of second type drives and complies with said second feature of said second storage area group, wherein said first feature corresponds to at least a performance or reliability that is different from that of said second feature,
wherein:
said first logical volume is, if necessary, allocated at least a part of said first storage areas of said first storage area group in response to a first write command targeted to said first logical volume from at least one of said plurality of host computers,
said second logical volume is, if necessary, allocated at least a part of said second storage areas of said second storage area group in response to a second write command targeted to said second logical volume from at least one of said plurality of host computers,
wherein said controller:
if an unused storage capacity of said first storage area group is below a first threshold value, adds, to said first storage area group, a fourth storage area which is provided from said plurality of first type drives, wherein a feature of said fourth storage area corresponds to at least said drive type of said plurality of first type drives and complies with said first feature of said first storage area group; and
if an unused storage capacity of said second storage area group is below a second threshold value, adds, to said second storage area group, a fifth storage area which is provided from said plurality of second type drives, wherein a feature of said fifth storage area corresponds to at least said drive type of said plurality of second type drives and complies with said second feature of said second storage area group.

34. The storage system according to claim 33,
wherein said controller allocates the at least the part of said first storage areas of said first storage area group to said first logical volume in response to the first write command; and
wherein said controller allocates the at least the part of said second storage areas of said second storage area group to said second logical volume in response to the second write command.

35. The storage system according to claim 33;
wherein said plurality of first storage areas and said fourth storage area are physical volumes provided from said plurality of first type drives;
wherein said plurality of second storage areas and said fifth storage area are physical volumes provided from said plurality of second type drives.

36. The storage system according to claim 33,
wherein said plurality of first type drives are Fibre Channel (FC) drives, and
wherein said plurality of second type drives are AT Attachment (ATA) drives.

37. The storage system according to claim 35,
wherein each of said physical volumes is provided from plural drives configuring a RAID group.

38. The storage system according to claim 33,
wherein said first feature indicates that storage areas included in said first storage area group should be provided from said plurality of first type drives.

39. The storage system according to claim 38,
wherein said second feature indicates that storage areas included in said second storage area group should be provided from said plurality of second type drives.

40. The storage system according to claim 33;
wherein said first storage area group is associated with said first logical volume, and
wherein said second storage area group is associated with said second logical volume.

* * * * *